(12) United States Patent
McNutt et al.

(10) Patent No.: US 7,435,176 B2
(45) Date of Patent: Oct. 14, 2008

(54) INTERACTIVE WAGERING SYSTEM WITH TOTALISATOR SELECTION

(75) Inventors: Richard E McNutt, Lafayette, CO (US); Masood Garahi, Superior, CO (US); John R Hindman, Los Angeles, CA (US); Connie T Marshall, Muskogee, OK (US); Douglas V Ramsey, Lousiville, CO (US); William L Thomas, Bixby, OK (US)

(73) Assignee: ODS Properties, Inc., Los Angeles, CA (US)

( * ) Notice: Subject to any disclaimer, the term of this patent is extended or adjusted under 35 U.S.C. 154(b) by 152 days.

(21) Appl. No.: 10/947,605

(22) Filed: Sep. 22, 2004

(65) Prior Publication Data
US 2005/0096109 A1    May 5, 2005

Related U.S. Application Data

(63) Continuation of application No. 09/687,616, filed on Oct. 13, 2000, now Pat. No. 6,837,791.

(60) Provisional application No. 60/194,800, filed on Apr. 5, 2000.

(51) Int. Cl.
    *A63F 9/24*    (2006.01)
(52) U.S. Cl. .................................................. 463/28
(58) Field of Classification Search ............... 463/28, 463/6, 25
    See application file for complete search history.

(56) References Cited

U.S. PATENT DOCUMENTS

| | | | |
|---|---|---|---|
| 3,762,712 A | 10/1973 | Beachley |
| 3,810,627 A | 5/1974 | Levy |
| 3,909,002 A | 9/1975 | Levy |
| 4,001,551 A | 1/1977 | Hirsimaki |
| 4,033,588 A | 7/1977 | Watts |
| 4,108,361 A | 8/1978 | Krause |

(Continued)

FOREIGN PATENT DOCUMENTS

EP    0 387 046 A2    9/1990

(Continued)

OTHER PUBLICATIONS

You Bet Help File, Youbet.com, Inc., Los Angeles, California, last modified Jul. 11, 1998, pp. 1-132.

(Continued)

*Primary Examiner*—Corbett B Coburn
(74) *Attorney, Agent, or Firm*—Ropes & Gray LLP

(57) ABSTRACT

A interactive wagering system is provided in which a user at user equipment may place electronic wagers with an interactive wagering application. The wagers may be horse race wagers. The interactive wagering application may handle wagers placed at multiple totalisators. The user may be provided with an opportunity to select a desired totalisator at which to place wagers or the interactive wagering application may automatically apply tote selection criteria to determine which of the multiple totalisators wagers are to be placed with. The user may review information on available odds and other information for each of the different totalisators. Automatic totalisator selection may be based on odds, tax consequences, licensing status, pool values, bulk benefits, user preference, available wager types, or other suitable criteria.

17 Claims, 21 Drawing Sheets

U.S. PATENT DOCUMENTS

| | | |
|---|---|---|
| 4,322,612 A | 3/1982 | Lange |
| 4,339,798 A | 7/1982 | Hedges et al. |
| 4,372,558 A | 2/1983 | Shimamoto et al. |
| 4,494,197 A | 1/1985 | Troy et al. |
| 4,593,904 A | 6/1986 | Graves |
| 4,636,951 A | 1/1987 | Harlick |
| 4,652,998 A | 3/1987 | Koza et al. |
| 4,689,742 A | 8/1987 | Troy et al. |
| 4,694,490 A | 9/1987 | Harvey et al. |
| 4,704,725 A | 11/1987 | Harvey et al. |
| 4,706,121 A | 11/1987 | Young |
| 4,745,468 A | 5/1988 | Von Kohorn |
| 4,747,600 A | 5/1988 | Richardson |
| 4,760,527 A | 7/1988 | Sidley |
| 4,764,666 A | 8/1988 | Bergeron |
| 4,799,683 A | 1/1989 | Bruner, Jr. |
| 4,815,741 A | 3/1989 | Small |
| 4,842,278 A | 6/1989 | Markowicz |
| 4,882,473 A | 11/1989 | Bergeron et al. |
| 4,922,522 A | 5/1990 | Scanlon |
| 4,926,255 A | 5/1990 | Von Kohorn |
| 4,926,327 A | 5/1990 | Sidley |
| 4,965,825 A | 10/1990 | Harvey et al. |
| 4,969,183 A | 11/1990 | Reese |
| 4,996,705 A | 2/1991 | Entenmann et al. |
| 5,007,649 A | 4/1991 | Richardson |
| 5,034,807 A | 7/1991 | Von Kohorn |
| 5,054,787 A | 10/1991 | Richardson |
| 5,057,915 A | 10/1991 | Von Kohorn |
| 5,083,271 A | 1/1992 | Thacher et al. |
| 5,083,272 A | 1/1992 | Walker et al. |
| 5,083,800 A | 1/1992 | Lockton |
| 5,096,195 A | 3/1992 | Gimmon |
| 5,096,202 A | 3/1992 | Hesland |
| 5,112,050 A | 5/1992 | Koza et al. |
| 5,119,295 A | 6/1992 | Kapur |
| 5,178,389 A | 1/1993 | Bentley et al. |
| 5,186,471 A | 2/1993 | Vancraeynest |
| 5,218,631 A | 6/1993 | Katz |
| 5,227,874 A | 7/1993 | Von Kohorn |
| 5,233,654 A | 8/1993 | Harvey et al. |
| 5,249,044 A | 9/1993 | Von Kohorn |
| 5,276,312 A | 1/1994 | McCarthy |
| 5,280,426 A | 1/1994 | Edmonds |
| 5,282,620 A | 2/1994 | Keesee |
| 5,283,734 A | 2/1994 | Von Kohorn |
| 5,286,023 A | 2/1994 | Wood |
| 5,297,802 A | 3/1994 | Pocock et al. |
| 5,326,104 A | 7/1994 | Pease et al. |
| 5,327,485 A | 7/1994 | Leaden |
| 5,333,868 A | 8/1994 | Goldfarb |
| 5,340,119 A | 8/1994 | Goldfarb |
| 5,351,970 A | 10/1994 | Fioretti |
| 5,354,069 A | 10/1994 | Guttman et al. |
| 5,365,575 A | 11/1994 | Katz |
| 5,398,932 A | 3/1995 | Eberhardt et al. |
| 5,403,999 A | 4/1995 | Entenmann et al. |
| 5,408,417 A | 4/1995 | Wilder |
| 5,415,416 A | 5/1995 | Scagnelli et al. |
| 5,417,424 A | 5/1995 | Snowden et al. |
| 5,459,306 A | 10/1995 | Stein et al. |
| 5,505,449 A | 4/1996 | Eberhardt et al. |
| 5,507,489 A | 4/1996 | Reibel et al. |
| 5,518,253 A | 5/1996 | Pocock et al. |
| 5,535,321 A | 7/1996 | Massaro et al. |
| 5,539,450 A | 7/1996 | Handelman |
| 5,539,822 A | 7/1996 | Lett |
| 5,545,088 A | 8/1996 | Kravitz et al. |
| 5,564,977 A | 10/1996 | Algie |
| 5,569,083 A | 10/1996 | Fioretti |
| 5,573,244 A | 11/1996 | Mindes |
| 5,575,474 A | 11/1996 | Rossides |
| 5,577,727 A | 11/1996 | Brame et al. |
| 5,586,937 A | 12/1996 | Menashe |
| 5,608,785 A | 3/1997 | Kasday |
| 5,643,088 A | 7/1997 | Vaughn et al. |
| 5,647,795 A | 7/1997 | Stanton |
| 5,672,106 A | 9/1997 | Orford et al. |
| 5,679,077 A | 10/1997 | Pocock et al. |
| 5,683,090 A | 11/1997 | Zeile et al. |
| 5,687,968 A | 11/1997 | Tarantino |
| 5,688,174 A | 11/1997 | Kennedy |
| 5,713,795 A | 2/1998 | Kohorn |
| 5,722,890 A | 3/1998 | Libby et al. |
| 5,724,521 A | 3/1998 | Dedrick |
| 5,729,212 A | 3/1998 | Martin |
| 5,746,657 A | 5/1998 | Ueno |
| 5,749,785 A | 5/1998 | Rossides |
| 5,755,621 A | 5/1998 | Marks et al. |
| 5,758,328 A | 5/1998 | Giovannoli |
| 5,759,101 A | 6/1998 | Von Kohorn |
| 5,762,552 A | 6/1998 | Vuong et al. |
| 5,772,511 A | 6/1998 | Smeltzer |
| 5,787,156 A | 7/1998 | Katz |
| 5,800,268 A | 9/1998 | Molnick |
| 5,816,917 A | 10/1998 | Kelmer et al. |
| 5,816,919 A | 10/1998 | Scagnelli et al. |
| 5,823,879 A | 10/1998 | Goldberg et al. |
| 5,830,067 A | 11/1998 | Graves et al. |
| 5,830,068 A | 11/1998 | Brenner et al. |
| 5,830,069 A | 11/1998 | Soltesz et al. |
| 5,842,921 A | 12/1998 | Mindes et al. |
| 5,851,149 A | 12/1998 | Xidos et al. |
| 5,871,398 A | 2/1999 | Schneier et al. |
| 5,910,047 A | 6/1999 | Scagnelli et al. |
| 5,954,582 A | 9/1999 | Zach |
| 5,991,735 A | 11/1999 | Gerace |
| 5,999,808 A | 12/1999 | LaDue |
| 6,001,016 A | 12/1999 | Walker et al. |
| 6,004,211 A | 12/1999 | Brenner et al. |
| 6,007,426 A | 12/1999 | Kelly et al. |
| 6,024,640 A | 2/2000 | Walker et al. |
| 6,024,641 A | 2/2000 | Sarno |
| 6,030,288 A | 2/2000 | Davis et al. |
| 6,080,062 A | 6/2000 | Olson |
| 6,080,063 A | 6/2000 | Khosla |
| 6,099,408 A | 8/2000 | Schneier et al. |
| 6,102,797 A | 8/2000 | Kail |
| 6,117,011 A | 9/2000 | Lvov |
| 6,117,013 A | 9/2000 | Eiba |
| 6,152,822 A | 11/2000 | Herbert |
| 6,152,824 A | 11/2000 | Rothschild et al. |
| 6,186,892 B1 | 2/2001 | Frank et al. |
| 6,203,427 B1 | 3/2001 | Walker et al. |
| 6,251,016 B1 | 6/2001 | Tsuda et al. |
| 6,251,017 B1 | 6/2001 | Leason et al. |
| 6,254,480 B1 | 7/2001 | Zach |
| 6,257,982 B1 | 7/2001 | Rider et al. |
| 6,263,054 B1 | 7/2001 | Haefliger |
| 6,264,560 B1 | 7/2001 | Goldberg et al. |
| 6,272,223 B1 | 8/2001 | Carlson |
| 6,273,820 B1 | 8/2001 | Haste, III |
| 6,320,868 B1 | 11/2001 | Okano et al. |
| 6,450,887 B1 | 9/2002 | Mir et al. |
| 6,631,356 B1 | 10/2003 | Van Horn et al. |
| 6,722,980 B2 * | 4/2004 | Stronach ..................... 463/25 |
| 2001/0003099 A1 | 6/2001 | Von Kohorn |
| 2001/0003100 A1 | 6/2001 | Yacenda |

FOREIGN PATENT DOCUMENTS

| | | |
|---|---|---|
| EP | 0 620 688 A2 | 10/1994 |
| EP | 0 624 039 A2 | 11/1994 |
| EP | 0 673 004 A2 | 9/1995 |

| | | | |
|---|---|---|---|
| EP | 0 673 004 A3 | 9/1995 |
| EP | 0 934 765 A1 | 8/1999 |
| GB | 2180675 | 4/1987 |
| GB | 2 300 535 A | 11/1996 |
| JP | HEI 01-25659 | 1/1989 |
| JP | 01-269157 | 10/1989 |
| JP | 02-110660 | 4/1990 |
| JP | 02-231671 | 9/1990 |
| JP | 0 583 196 A1 | 2/1994 |
| JP | 06-325062 | 11/1994 |
| NZ | 272983 | 2/1997 |
| PT | 0 873 772 A1 | 10/1998 |
| WO | WO 95/01058 | 1/1995 |
| WO | WO 95/22883 | 8/1995 |
| WO | WO 95/30944 | 11/1995 |
| WO | WO 97/01145 | 1/1997 |
| WO | WO 97/09699 | 3/1997 |
| WO | WO 97/19428 | 5/1997 |
| WO | WO 97/28636 | 8/1997 |
| WO | WO 97/44750 | 11/1997 |
| WO | WO 98/21877 | 5/1998 |
| WO | WO 99/04568 | 1/1999 |
| WO | WO 00-67215 | 11/2000 |
| WO | WO 00/77752 | 12/2000 |

OTHER PUBLICATIONS

Maury Wolff, "Interactive Wagering A Good Bet," Daily Racing Form, Jan. 29, 1995, p. 4.

John Burgess, "And We're Off To The Races!" The Washington Post, Jan. 16, 1995, pp. 17-18.

Ross Peddicord, "New On TV: You Bet Your Horse," The Sun, Baltimore, Maryland, Dec. 15, 1994.

Yee-Hsiang Chang et al., "An Open-Systems Approach To Video On Demand," IEEE Communications Magazine, May 1994, pp. 68-80.

TrackMaster User's Guide Version 2.0.7, Apr. 1994, AXCIS Pocket Information Network, Inc., Santa Clara, California, p. 1-122.

Tiny Tim Brochure, AutoTote Systems, Inc., Newark, Delaware (undated).

Probe XL Brochure, AutoTote Systems, Inc., Newark, Delaware (undated).

Scaine, Scarne's New Complete Guide to Gambling, 1974, pp. 32-108.

Daley, "Easy Goer No. 1 choice in Vegas," Telegram & Gazette, Oct. 20, 1989, p. B5.

Gray, "Racing Beat: Mass. turns back on Future-Wage defies 36-hour statute," Boston Herald, Feb. 3, 2000, p. 077.

O'Donnell, "It's another pool party," Chicago Sun-Times, Mar. 10, 2000, p. 128.

"Kentucky Derby wagering starts at Lincoln," the Providence Journal, Feb. 18, 2000, p. D07.

"Early Birds Can Catch Big Cash On The Derby," Pittsburhg Post-Gazette, Mar. 5, 2000, p. D18.

"Autotote and Arena Leisure Announce Joint Venture for Internet Wagering," PR Newswir, Feb. 9, 2000, p. 1.

"TRC Thoroughbred Notebook," www.webcom/alauck/trc/trc00/trcm217.html, Feb. 17, 2000, printed on Mar. 3, 2006.

US 5,823,877, 10/1998, Scagmelli et al. (withdrawn)

* cited by examiner

476

SELECT TOTE FOR YOUR WAGER

| NAME | ODDS | TAX | POOL VALUE |
|------|------|-----|------------|
| TOTE 1 | 5:1 | Y | VALUE 1 |
| TOTE 2 | 4:1 | Y | VALUE 2 |
| TOTE 3 | 6:1 | Y | VALUE 3 |
| TOTE 4 | 4:1 | N | VALUE 4 |
| TOTE 5 | 5:1 | N | VALUE 5 |

ACCOUNT INFORMATION

| TOTE | ACCOUNT BALANCE |
|------|-----------------|
| TOTE 1 | $ 125.00 |
| TOTE 2 | $ 842.10 |
| TOTE 3 | $ 2492.05 |
| TOTE 4 | $ 47.32 |

INTERACTIVE WAGERING SYSTEM WITH TOTALISATOR SELECTION

This is a continuation of U.S. patent application No. 09/687,616, filed Oct. 13, 2000, now U.S. Pat. No. 6,837,791 which claims the benefit of U.S. provisional application No. 60/194,800, filed Apr. 5, 2000. All of these prior applications are incorporated by reference herein in their entireties.

BACKGROUND OF THE INVENTION

This invention relates to interactive wagering systems, and more particularly, to interactive wagering systems in which totalisators may be selected.

Wagering is a popular leisure activity. For example, many racing fans wager on events such as horse, dog, and harness racing. However, it may be inconvenient to attend racing events in person. Not all racing fans have sufficient time to visit racetracks as often as they would like and some fans have difficulties in obtaining suitable transportation to the track. Off-track betting establishments are available for fans who cannot attend racing events in person, but fans must still travel to the off-track betting establishments.

As a result, interactive television wagering systems have been developed in which fans may place off-track wagers using set-top boxes connected to their televisions. Interactive wagering systems may also be provided that allow users to wager through a personal computer or the like.

It is an object of the present invention to provide interactive wagering systems in which the totalisator systems used to handle a user's electronic wager may be selected.

SUMMARY OF THE INVENTION

The present invention relates to systems and methods for providing a wagering system back office and for managing tote interaction. More particularly, the present invention relates to systems and methods for enabling wagerers to receive wagering and handicapping data, place wagers, and receive and submit any other suitable information and data. The present invention also relates to systems and methods which control the interaction of wagering systems with multiple totes.

In order to enable wagering from a wide variety of wagering platforms, such as telephones, access devices (such as computers, personal digital assistants, and portable browsers), it is desirable to provide a system that integrates these platforms with current wagering systems.

A interactive wagering system is provided in which a user at user equipment may place electronic wagers with an interactive wagering application. The wagers may be horse race wagers. The interactive wagering application may handle wagers placed at multiple totalisators. The user may be provided with an opportunity to select a desired totalisator at which to place wagers or the interactive wagering application may automatically apply tote selection criteria to determine which of the multiple totalisators wagers are to be placed with. The user may review information on available odds and other information for each of the different totalisators. Automatic totalisator selection may be based on odds, tax consequences, licensing status, pool values, bulk benefits, user preference, available wager types, or any other suitable criteria.

Further features of the invention, its nature and various advantages will be more apparent from the accompanying drawings and the following detailed description of the preferred embodiments.

BRIEF DESCRIPTION OF THE DRAWINGS

FIG. 16 shows another illustrative screen that may be displayed for the user to allow the user to view the current odds offered by a selected tote for each of the user's wagers in accordance with the present invention.

FIG. 20 is an illustrative screen that may be displayed to provide the user with account balance information for accounts at multiple totes in accordance with the present invention.

DETAILED DESCRIPTION OF THE PREFERRED EMBODIMENTS

Figure 1:
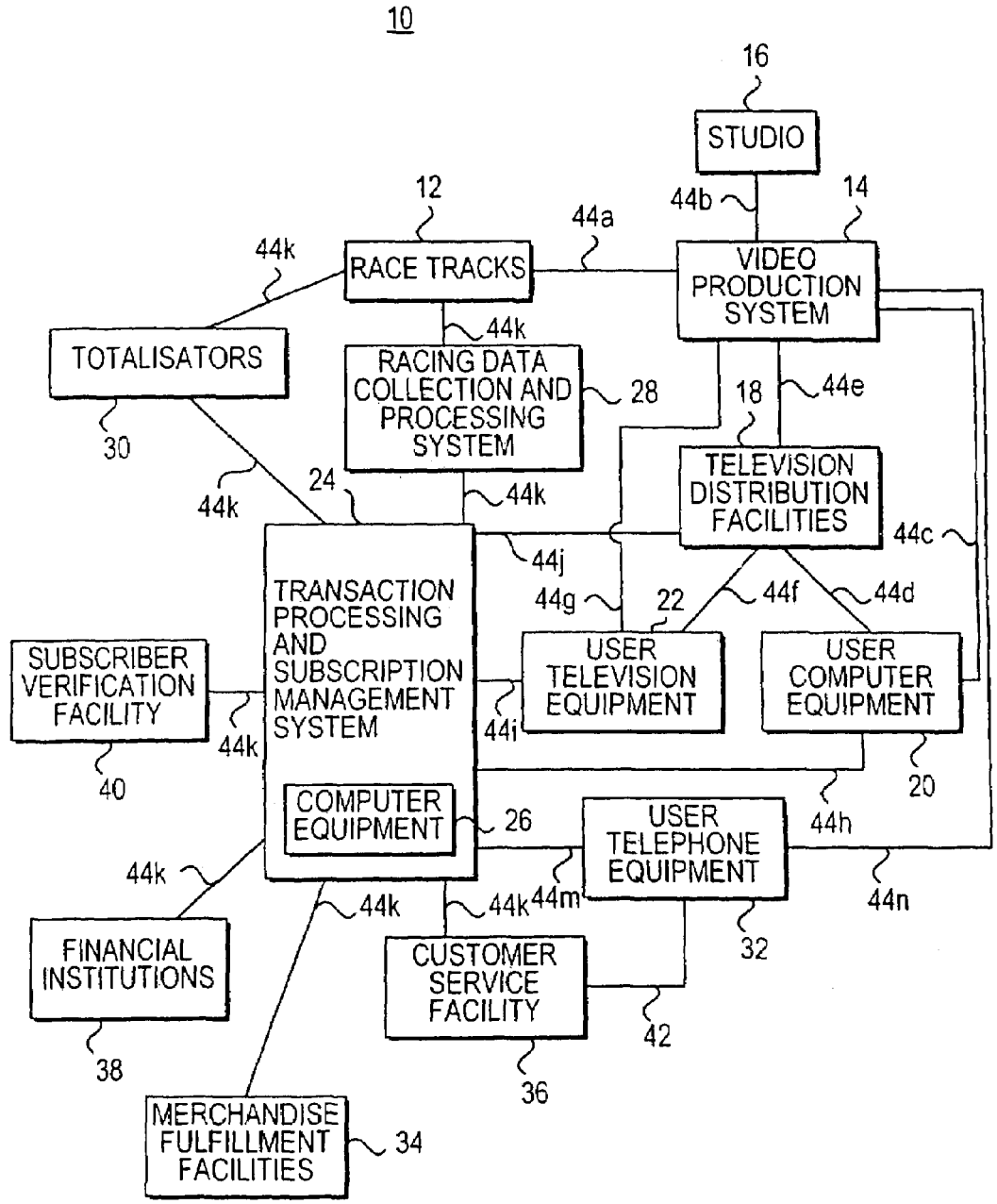
FIG. 1 is a schematic diagram of an illustrative interactive wagering system in accordance with the present invention.

An illustrative system 10 in accordance with the present invention is shown in FIG. 1. Aspects of the invention apply to various types of interactive wagering systems. The invention is described herein primarily in the context of interactive wagering on races (e.g., horse races) for specificity and clarity.

Races may be run at racetracks 12, which may be located at various geographic locations. Races run at the racetracks may be simulcast to television viewers. For example, simulcast videos may be provided to users with satellite receivers or to off-track betting establishments via satellite.

System 10 may be used to provide an interactive wagering service to users of various user equipment. An interactive wagering application may be used to provide the wagering service. The interactive wagering application may run locally on the user equipment (e.g., on a set-top box, personal computer, electronic book, cellular telephone, handheld computing device, etc.) or may run using a client-server or distributed architecture where some of the application is implemented locally on the user equipment in the form of a client process and some of the application is implemented at a remote location (e.g., on a server computer or other such equipment in the system) as a server process. These arrangements are merely illustrative. Other suitable techniques for implementing the interactive wagering application may be used if desired.

Real-time videos from racetracks 12 may also be provided to video production system 14 for distribution to users as part of a television wagering service (i.e., a wagering-related television channel or Internet-delivered service or the like). If desired, multiple simulcast videos may be provided to video production system 14 in real-time. Talent (e.g., commentators) for the television wagering-service provided by the interactive wagering application may be located at studio 16. Studio 16 may provide a video feed containing commentary and the like to video production system 14. Graphic overlays for the television wagering service (i.e., embedded graphics) may be added to the service at video production system 14.

The television wagering service may use video production system 14 to combine selected video segments from desired racing simulcasts with the video feed from studio 16 and suitable graphic overlays. If desired, video production system 14 or a separate facility may be used to reformat simulcasts from racetracks 12. For example, if racetracks 12 provide simulcasts as traditional analog television channels, video production system 14 (or a separate facility) may convert these simulcasts or portions of these simulcasts into digital signals (e.g., digital video signals) or into a different number of analog signals. Digital video signals may require less bandwidth than analog video signals and may be appropriate for situations in which videos are to be transmitted over either high or low bandwidth pathways. Low bandwidth pathways may include telephone lines, the Internet, etc.

Video production system 14 may be used to provide a television wagering service that includes selected simulcast videos, video from studio 16, and graphic overlays to television distribution facilities 18 (for redistribution to user television equipment 22 and user computer equipment 20), to user computer equipment 20, and to user telephone equipment 32 (if user telephone equipment 32 has a display capable of displaying moving images). Television distribution facilities 18 may be any suitable facilities for supplying television to users, such as cable system headends, satellite systems, broadcast television systems, or other suitable systems or combinations of such systems. User computer equipment 20 may be any suitable computer equipment that supports an interactive wagering application. For example, user computer equipment 20 may be a personal computer. User computer equipment 20 may also be based on a mainframe computer, a workstation, a networked computer or computers, a laptop computer, a notebook computer, a handheld computing device such as a personal digital assistant or other small portable computer, etc. One aspect of the invention involves the use of an electronic book platform as user computer equipment 20 or part of user computer equipment 20.

Each of television distribution facilities 18 is typically located at a different geographic location. Users with user television equipment 22 may receive the television wagering service from an associated television distribution facility. User television equipment 22 may include, for example, a television or other suitable monitor. A television may be used to watch the television wagering service on a traditional analog television channel. User television equipment 22 may also include a digital or analog set-top box connected to a television distribution facility 18 by a cable path. A digital set-top box may be used to receive the television wagering service on a digital channel. If desired, user television equipment 22 may contain a satellite receiver, a WebTV box, a personal computer television (PC/TV), or hardware similar to such devices into which set-top box capabilities have been integrated. A recording device such as a videocassette recorder or digital recording device (e.g., a personal video recorder or digital video recorder based on hard disk drives or the like) may be used in user television equipment 22 to store videos. The recording device may be separate from or part of the other components of user television equipment 22.

User computer equipment 20 may receive the television wagering service using a video card or other video-capable equipment to receive analog or digital (e.g., moving picture experts group or MPEG) videos from a television distribution facility. User computer equipment 20 may also receive the television wagering service directly from video production system 14 using, for example, a modem link. If desired, the video for the television wagering service may be compressed (e.g., using MPEG techniques). This may be useful, for example, if the path to user computer equipment 20 is a modem connection using telephone links. If video production system 14 is only used to serve user computer equipment 20 without traditional analog television capabilities, video production system 14 may only need to supply such digitally-compressed video signals and not analog television signals.

Video clips of races and other simulcast information may be provided to users in the form of a television wagering service or by an interactive wagering service provided by the interactive wagering application. If desired, race-related videos may be provided to the user by using video production system 14 or other suitable equipment to route appropriate video clips from the simulcasts to the user in real time. Video clips may also be stored for later viewing. For example, one or more video servers located at racetracks 12, video production system 14, television distribution facilities 18, or other suitable locations may be used to store video clips. The stored videos may then be played back in real time or downloaded for viewing at user television equipment 22, user computer equipment 20, or user telephone equipment 32. The video clips may contain videos of races, commentary, interviews with jockeys, or any other suitable race-related information. If desired, real-time or stored videos may be provided from racetracks 12 directly to user television equipment 22, user computer equipment 20, or user telephone equipment 32 over the Internet or other suitable communications paths without involving video production system 14. Videos may also be provided by routing video signals through equipment located elsewhere in system 10. For example, videos may be routed through transaction processing and subscription management system 24.

Transaction processing and subscription management system 24 may contain computer equipment 26 and other equipment for supporting system functions such as transaction processing (e.g., handling tasks related to wagers, product purchasing, adjusting the amount of funds in user accounts based on the outcomes of wagers, video clip ordering, etc.), data distribution (e.g., for distributing racing data to the users), and subscriber management (e.g., features related to opening an account for a user, closing an account, allowing a user to add or withdraw funds from an account, changing the user's address or personal identification number, etc.). Databases within transaction processing and subscription management system 24 or associated with system 24 may be used to store racing data, wagering data and other transaction data, and subscriber data such as such as information on the user's current account balance, past wagering history, individual wager limits, personal identification number, billing addresses, credit card numbers, bank account numbers, social security numbers, etc. Using such databases may allow the user to access information more quickly and allows for central administration of the wagering service.

If desired, racing videos and other services may be provided using servers and other equipment located at transaction processing and subscription management system 24. For example, video clips may be provided to the user on-demand. Interactive advertisements may be provided to the user. When the user selects a desired advertisement, transaction processing and subscription management system 24 may provide additional information or other services related to the advertisement to the user.

Product ordering services may be implemented using computer equipment at transaction processing and subscriber management system 24 to handle orders and to assist in adjusting the appropriate account of the user accordingly. Orders may be fulfilled using merchandise fulfillment facilities 34. Merchandise fulfillment facilities 34 may be operated solely to provide merchandise fulfillment or may be associated with independently-operated mail-order or on-line businesses. Similar facilities may be used to allow users to order services.

Statistical racing data such as the post times for each race, jockey names, runner names and the number of races associated with each track, handicapping information (e.g., information on past performances such as the number of wins and losses for the past year, etc.), and weather conditions at various tracks may be provided by racing data collection and processing system 28. Some of the data may be collected from racetracks 12 and some may be provided by third party information sources such as Axcis Pocket Information Network, Inc. of Santa Clara, Calif. or other suitable data sources.

Racing data may also be provided from totalisators 30. Totalisators 30 are the computer systems that may be used to handle wagers made at the racetracks, made at off-track betting establishments, and made using interactive wagering system 10. Totalisators 30 generate wagering odds in real time. Totalisators 30 generate these odds based on information on which wagers are being placed (e.g., based on information on which wagers are-being placed on races at racetracks 12). Totalisators 30 are available from companies such as Amtote International, Inc. of Hunt Valley, Md. Totalisators 30 may be associated with individual racetracks 12 or groups of racetracks 12. Totalisators 30 may communicate with one another using a communication protocol known as the Intertote Track System Protocol (ITSP). This allows totalisators 30 to share wagering pools. Totalisators 30 may provide racing data including information on'the current races at racetracks 12, the number of races associated with each racetrack, win, place, and show odds and pool totals for each horse or other runner, and exacta, trifecta, and quinella payoff predictions and pool totals for every possible combination of runners. Totalisators 30 may also provide current odds and other real-time racing data for other types of wagers. Totalisators 30 may provide the time until post time for each race.

Totalisators 30 may provide race results, such as the order-of-finish list for at least the first three positions and payoff values versus a standard wager amount for win, place, and show, for each runner in the finish list. Payoff values may be provided for winning complex wager types such as exacta, trifecta, quinella, pick-n (where n is the number of races involved in the pick-n wager), and daily double. The payoff values may be accompanied by a synopsis of the associated finish list.

Totalisators 30 may also provide program information of the type typically provided in printed racing programs. Such program information may include early odds, early scratches, race descriptions (including the distance of each race and the race surface—grass, dirt, artificial turf, etc.), allowed class ratings (based on a fixed ratio of external criteria), purse value (payoff to winning runner), allowed age range of runners, and the allowed number of wins and starts for each runner.

If desired, some of the information provided to transaction processing and subscription management system 24 by totalisators 30 (such as the program information or other suitable racing data) may be provided by racing data collection and processing system 28. Similarly, some of the information provided to transaction processing and subscription management system 24 by racing data collection and processing system 28 may be provided by totalisators 30. Moreover, the foregoing examples of different suitable types of racing data are merely illustrative. Any suitable data related to racing may be provided to transaction processing and subscription management system 24 if desired.

Transaction processing and subscription management system 24 provides the racing data to users at user television equipment 22, user computer equipment 20, and user telephone equipment 32 for use in following race results and developing wagers. If desired, racing data may be provided to users using paths that do not directly involve transaction processing and subscription management system 24. For example, racing data may be provided from racing data collection and processing system 28 to user television equipment 22, user computer equipment 20, or user telephone equipment 32 using the Internet or other suitable communications paths.

User telephone equipment 32 may be a conventional telephone, a cordless telephone, a cellular telephone or other portable wireless telephone, or any other suitable telephone equipment. Users at user television equipment 22 and user computer equipment 20 may view information on the racing data on a television or other suitable monitor. Users at user telephone equipment 32 may listen to racing data using an interactive voice system. User telephone equipment 32 may be based on cellular telephones with displays. Users may view racing data displayed on such displays.

Users who wish to place wagers may establish an account at transaction processing and subscription management system 24. One or more accounts may also be established at totalisators 30. The user and the interactive wagering services may have their own bank accounts at financial institutions 38. A user may set up an account electronically by using user television equipment 22, user computer equipment 20, or user telephone equipment 32 to interact with the subscriber management functions of transaction processing and subscription management system 24. If desired, accounts may be established with the interactive wagering service with the assistance of customer service representatives at customer service facility 36. Customer service facility 36 may be at the same location as transaction processing and subscription management system 24, may be part of system 24, or may be located remote from system 24. Customer service representatives at customer service facility 36 may be reached by telephone. If user telephone equipment 32 is used to access the interactive wagering service, for example, user telephone equipment 32 may be used to reach the customer service representative using communications path 42. If user television equipment 22 or user computer equipment 20 is being used with the service, a telephone at the same location as that equipment may be used to reach the customer service representative.

The user's identity may be checked using social security number information or other identification information with the assistance of subscriber verification facility 40. The services of subscriber verification facility 40 are used to ensure that the user lives in a geographic area in which wagering is legal, that the user is of a legal age, and that the identification information (e.g., the user's social security number) matches the name provided by the user. If the user is using a cellular telephone or handheld computing device, the user's present physical location may be determined by determining which general part of the cellular telephone network is being accessed by the user or by using the cellular network or a handset-based location device such as a global positioning system (GPS) receiver in the body of the cellular telephone to pinpoint the user's location. This location information may be used to verify that the user is located in a geographic area where wagering is legal.

In a typical enrollment process, the user provides personal information to the interactive wagering service and provides funds with a credit card or funds from the user's bank account. The interactive wagering service sets up an account for the user at transaction processing and subscription management system 24 and directs one of totalisators 30 to set up a new account for the user at the totalisator. The totalisator is also directed to credit the user's account to reflect the amount of funds provided by the user. After the user places a wager and wins or loses, the totalisator adjusts the user's totalisator account to reflect the outcome of the wager. The totalisator may periodically inform the interactive wagering service of the adjusted balance in the user's account. This may be accomplished using any suitable technique (e.g., periodically, continuously, on-request, etc.). For example, reports may be collected periodically (e.g., once a day in an end-of-day report) and provided to the interactive wagering service to reconcile the account balances at transaction processing and subscription management system 24 with the account balances at totalisators 30.

If the user makes a balance inquiry, the inquiry may be passed to the appropriate totalisator by transaction processing and subscription management system 24. If the user is charged a fee for subscribing to the service, the service may debit the fee from the user's account at the transaction processing and subscription management system 24.

The accounts at totalisators 30 and transaction processing and subscription management system 24 are typically maintained separately, because the business entities that operate totalisators 30 and transaction processing and subscription management system 24 are independent. If desired, financial functions related to opening and maintaining user accounts and the like may be handled using computer equipment at another location such as one of financial institutions 38 or other location remote from totalisators 30 and system 0.24. Such financial functions may also be implemented primarily at a totalisator 30 or primarily at the transaction processing and subscription management system 24 if desired.

Users at user television equipment 22, user computer equipment 20, and user telephone equipment 32 may place wagers by providing wagering data and otherwise interacting with transaction processing and subscription management system 24. The interactive wagering service may provide a user at user television equipment 22, user computer equipment 20, or user telephone equipment 32 that has display capabilities with screens containing various racing data. For example, the user may be presented with screens that allow the user to view the current odds for horses in an upcoming race at a given track.

The service may provide the user with interactive screens containing menus and selectable options that allow the user to select a desired racetrack and race on which to wager. The user may also specify the type of wager in which the user is interested, the desired wager amount, and the horse(s) for the wager. When the user has finished creating the wager, the wager may be submitted to transaction processing and subscription management system 24 for processing.

The user may make selections during the creation and placing of wagers using various arrangements. With an electronic book arrangement, for example, the user may press dedicated buttons on the electronic book or may select on-screen options by touch or by using handwriting recognition. With a set-top box arrangement, the user may use a remote control or wireless keyboard to navigate the various menus and selectable options. With a personal computer, the user may use a keyboard, mouse, trackball, touch pad, or other suitable input or pointing device. With a cellular telephone with a display, the user may use buttons on the telephone. When the user has made appropriate selections to define a desired wager, the user television equipment, user computer equipment, or user telephone equipment may transmit wagering data for the wager to transaction processing and subscription management system 24.

Users with telephones may also interact with the service using an interactive voice response system located at transaction processing and subscription management system 24. The interactive voice response system may present menu options to the user in the form of audio prompts (e.g., "press 1 to select a $2 wager amount," etc.). The user may interact with the service be pressing the corresponding buttons on a touch tone telephone. User telephone equipment 32 that is based on cellular telephones allows the user to interact with the wagering service in this way. User telephone equipment 32 that is based on cellular telephones with messaging and display capabilities also allows the user to interact visually with the interactive wagering service.

The components of system 10 may be interconnected using various communications paths 44. Communications paths 44 may include satellite paths, coaxial cable paths, fiber-optic paths, twisted pair paths, other wire or cable-based links, wireless paths through free space, or any other suitable paths or combination of such paths. Communications over paths 44 may involve analog transmissions, digital transmissions, wireless transmissions, microwave transmissions, radio-frequency transmissions, optical transmissions, audio transmissions, or any other suitable type of transmissions or combination of such transmissions. Communications may involve Internet transmissions, private network transmissions, packet-based transmissions, television channel transmissions, transmissions in the vertical blanking interval of a television channel or on a television sideband, MPEG transmissions, etc. Communications may involve wireless pager or other messaging transmissions. Communications paths 44 may include cable connected to cable modems, digital subscriber lines, integrated services digital network (ISDN) lines, or any other suitable paths. Examples of suitable communications paths are described below. Those examples are, however, merely illustrative. Any of the communications path arrangements described above or other suitable arrangements may be used if desired.

Communications paths that carry video and particularly uncompressed analog video or lightly-compressed or full-screen digital video generally use more bandwidth than communications paths that carry only data or that carry partial-screen digital video. For example, if it is desired to transmit high-quality simulcasts of races from racetracks 12 to video production system 14, analog or digital videos may be transmitted from racetracks 12 to video production system 14 over path 44*a* using satellite links. Video may be transmitted from studio 16 to video production system 14 over path 44*b* using a satellite link or a high-speed terrestrial path such as a fiber-optic path. Studio 16 may also be located at the same site as video production system 14, thereby avoiding the need for a long-haul transmission path. Videos may be transmitted from video production system 14 to user computer equipment 20 over path 14*c* using a modem link (using, for example, a digital subscriber line, a telephone network link, a wireless link etc.) The modem link may be made over a private network.

A user with a cable modem may connect a personal computer or other user computer equipment 20 to an associated cable system headend using path 44*d*. (The headend in such an arrangement would be one of the television distribution facilities 18 shown in FIG. 1.) The user may then receive videos from the headend via cable modem. Videos may be provided to the headend over path 44*e* using a network link, fiber optic links, cable links, microwave links, satellite links, etc. A user with a set-top box or similar device (shown in FIG. 1 as user television equipment 22) may also receive videos from a cable system headend using a cable modem or other such communications device over path 44*f*. In addition, a user with user television equipment may receive videos over the Internet or a private network using a telephone-based modem or other such communications device using path 44*g*. In a system with distributed processing, interactive wagering services may be provided using a television distribution facility 18 that includes equipment that supplements or replaces at least some of the equipment at transaction processing and subscription management system 24.

If desired, user television equipment 22 or user computer equipment 20 may receive analog or digital videos from an associated television distribution facility over the communications paths normally used to distribute television programming (e.g., paths 44*f* and 44*d*). For example, videos may be received as part of a dedicated interactive wagering service television channel. If videos are provided as digital signals (e.g., MPEG signals), 10 or more digital videos may be carried on a single analog channel (or one digital video may be carried on one-tenth of the bandwidth of an analog channel). If the videos are not full-screen videos, even more videos may be simultaneously provided without a loss of image quality.

Racing videos may be provided to user telephone equipment 32 over a partially-wireless telephone Internet link or other telephone link using path 44*n*.

If desired, racing data may accompany the racing videos along any of these paths. Moreover, racing videos may be provided by routing them directly from racetracks 12 to user television equipment 22, user computer equipment 20 (e.g., over the Internet or a private network, etc.), or user telephone equipment 32. Racing videos may also be provided by routing them through transaction processing and subscription management system 24. If a cellular telephone or portable computing device has sufficient display capabilities to support moving images, racing videos may be displayed. Such videos may be provided using any suitable path, such as a direct path from racetracks 12, a path through video production system 14 or other suitable video processing equipment, through a hub such as transaction processing and subscription management system 24, etc. Racing videos may be provided in real time or may be recorded for later distribution. Videos that are not provided in real-time may be downloaded by user television equipment 22, user computer equipment 20, a cellular telephone, or other suitable user equipment at a lower data rate than would otherwise be required and may be downloaded in the background if desired. Such videos may also be provided to the user at real-time video rates for direct viewing by the user.

Racing data and other information related to the interactive wagering service may be provided to users over paths connected to transaction processing and subscription management system 24. For example, racing data and other data for the service may be provided to user computer equipment 20 over path 44*h* using a modem link. Path 44*h* may be a private network path or an Internet path. Path 44*h* may use telephone lines, digital subscriber lines, ISDN lines, wireless data paths, or any other suitable type of communications links. User television equipment 22 may receive data for the wagering service over communications path 44*i*, which may be a telephone line, digital subscriber line, ISDN line, or other suitable type of communications path and which may use a private network path or an Internet path, etc.

Data for the wagering service may be provided to users of the interactive wagering application via communications path 44*j* and paths 44*f* and 44*d*. Communications path 44*j* may be provided over a private network, using the public telephone network, using satellite links, or any other suitable type of links. Data from paths such as path 44*j* may be routed to paths such as paths 44*f* and 44*d* directly by associated television distribution facilities 18, or may be buffered at television distribution facilities 18 if desired. Paths 44*f* and 44*d* may include coaxial cable and use of paths 44*f* and 44*d* may involve the use of cable modems or the like. If data is provided over path 44*j* and path 44*f* or path 44*d* using an Internet protocol, a web browser or similar software running on user television equipment 22 or user computer equipment 20 may be used to access the data. Such software may be integrated into the interactive wagering application or may be used separately. Software may also be used to view videos and may be used on other platforms (e.g., advanced cellular telephones) if desired.

The communications paths 44*k* that are used to connect various other components of the system typically do not carry high-bandwidth video signals. Accordingly, paths 44*k* may be telephone-like paths that are part of the Internet or a private network. Such paths and various other paths 44 may be dedicated connections for security, reliability, and economy.

User telephone equipment 32 may receive information for the wagering service via path 44*m*. If user telephone equipment 32 is a standard (non-cellular) telephone, such information may be in the form of audio prompts ("press 1 to place a wager") and audio racing data ("the current win odds for horse 2 are 5-1"). Transaction data processing and subscription management system 24 may contain interactive voice response equipment that provides such information to the user and that responds to touch-tone signals from the user when the user responds to prompts by pressing buttons on the user's telephone.

If user telephone equipment 32 is a cellular telephone, racing data and other information for the interactive wagering service may be provided to the user by using a cellular wireless connection as part of path 44*m*. Users with cellular telephones may be provided with audio prompts using an interactive voice response system located at transaction processing and subscription management system 24 to which the users may respond by pressing cellular telephone buttons to generate touch-tone signals.

Racing data and other information for the interactive wagering service may be provided to cellular telephones in the form of alphanumeric messages. Such messages may be transmitted to the user by using paging or other alphanumeric messaging formats or any other suitable data communications scheme. If desired, data may be provided to the cellular telephones over the voice channel and decoded by the cellular telephone using modem circuitry or other suitable circuitry. Data may also be provided using any other suitable cellular or wireless path. Regardless of the way in which racing data and other information for the interactive wagering service are provided to the cellular telephone, such information may be provided to the user by displaying it on the cellular telephone display screen or by presenting it in audible form through the speaker of the cellular telephone.

Racing data and other interactive wagering service information for the users may be provided in one or more continuous data streams, may be provided periodically (e.g., once per hour or once per day), or may be provided using a client-server arrangement in which data is requested by a client processor (e.g., user television equipment 22, user computer equipment 20, user telephone equipment 32, or any other such equipment) from a server (e.g., a server implemented using computer equipment 26 at transaction processing and subscription management system 24 or computer equipment at another suitable location). Videos may also be provided using any of these techniques.

A return communications path between the user and the interactive wagering service may be used to allow the user to place wagers and otherwise interact with the interactive wagering service. For example, a user with a standard telephone or a cellular telephone may interact with the service by pressing touch-tone keys on the telephone in response to audio prompts provided by an interactive voice response system at transaction processing and subscription management system 24. If desired, users may call customer service representatives at customer service facility 36 and place wagers with manual assistance. The user of a cellular telephone may interact with the wagering service by selecting menu options and otherwise interacting with information displayed on the cellular telephone. When a selection is made, software implemented on the telephone may be used to assist the user in transmitting appropriate data (e.g., wagering data) to the wagering service. Such data may be transmitted using any suitable technique. For example, data may be transmitted using a wireless data link that is separate from the cellular voice channels. Data may also be transmitted over the voice channel (e.g., using a modem built into the cellular telephone, by automatically generating touch-tone signals that may be recognized by the interactive voice response system at transaction processing and subscription management system 24, or using any other suitable arrangement). These approaches may be used even if the user receives racing data and other information for the service using a platform other than a telephone-based platform.

Users with user television equipment 22 may interact with the service by sending data (e.g., wager data) to transaction processing and subscription management system 24 using path 44*i* or using paths 44*f* and 44*j*. Users with user computer equipment 20 may send data (e.g., wager data) to transaction processing and subscription management system 24 via path 44*h* or paths 44*d* and 44*j*. Users at any user equipment may send data for the service to locations other than transaction processing and subscription management system 24. For example, the user may provide information directly to customer service facility 36, etc.

If desired, the user may send data to the service at transaction processing and subscription management system 24 using different paths than those used to receive data from transaction processing and subscription management system 24. For example, racing data may be received at user television equipment 22 via paths 44*j* and 44*f*, whereas data may be sent by the user from user television equipment 22 to transaction processing and subscription management system 24 using path 44*i*, etc. Moreover, the paths used to receive certain video information may be different from those used to receive racing data. For example, user television equipment 22 may receive racing videos using path 44*f*, but may receive racing data using path 44*i*. These examples are merely illustrative. Any suitable combination of paths may be used to distribute racing data and other information for the interactive wagering service, any suitable combination of paths may be used to receive videos, and any suitable combination of paths may be used to send data to the wagering service.

If desired, the user may interact with the wagering service using more than one platform. For example, the user may place a wager using a cellular telephone while the user is driving home. When the user arrives home, the user may determine the outcome of the wager by watching a video of the race on user television equipment. Later in the day, the user may check the user's account balance using a personal computer. This is merely an illustrative example. The various wagering platforms may be used in any suitable combination.

Although system 10 has been described in the context of a system that supports multiple wagering platforms, system 10 may support fewer platforms if desired. For example, aspects of the invention may be implemented using a system 10 that only supports wagering from set-top boxes. If desired, system 10 may be configured so that it does not support wagering with telephone or computer equipment. The system may support electronic books, personal computers, cellular telephones and/or handheld computing devices such as personal digital assistants, palm-sized computers, etc. in combination with any other suitable platforms.

The features of the present invention are described herein primarily in the context of an interactive wagering application implemented on user equipment such as a set-top box connected to a television. This is only illustrative. An interactive wagering application implemented on any suitable platform (user computer equipment, user television equipment, user telephone equipment, etc.) may be used to provide such features if desired. In set-top box arrangements, on-screen options may be made larger than they appear in computer-based arrangements to accommodate the greater viewing distance from which televisions are typically operated. Options may be selected by highlighting them using remote control arrow keys and by pressing an appropriate key such as an OK or enter or select key. In personal computer arrangements, on-screen options may be selected by clicking on a desired link or option using a mouse or other pointing device. In cellular telephone arrangements and handheld computer arrangements, options and information may be displayed using smaller screens than are typically available on personal computer or set-top box arrangements. To accommodate the smaller screen size, options that might otherwise be presented on a single screen may be displayed using multiple screens or layered menus. Options may be selected by highlighting them using navigation keys and pressing an appropriate select button on the cellular telephone or handheld computing device or by using a pen-based interface or the like.

Figure 2:
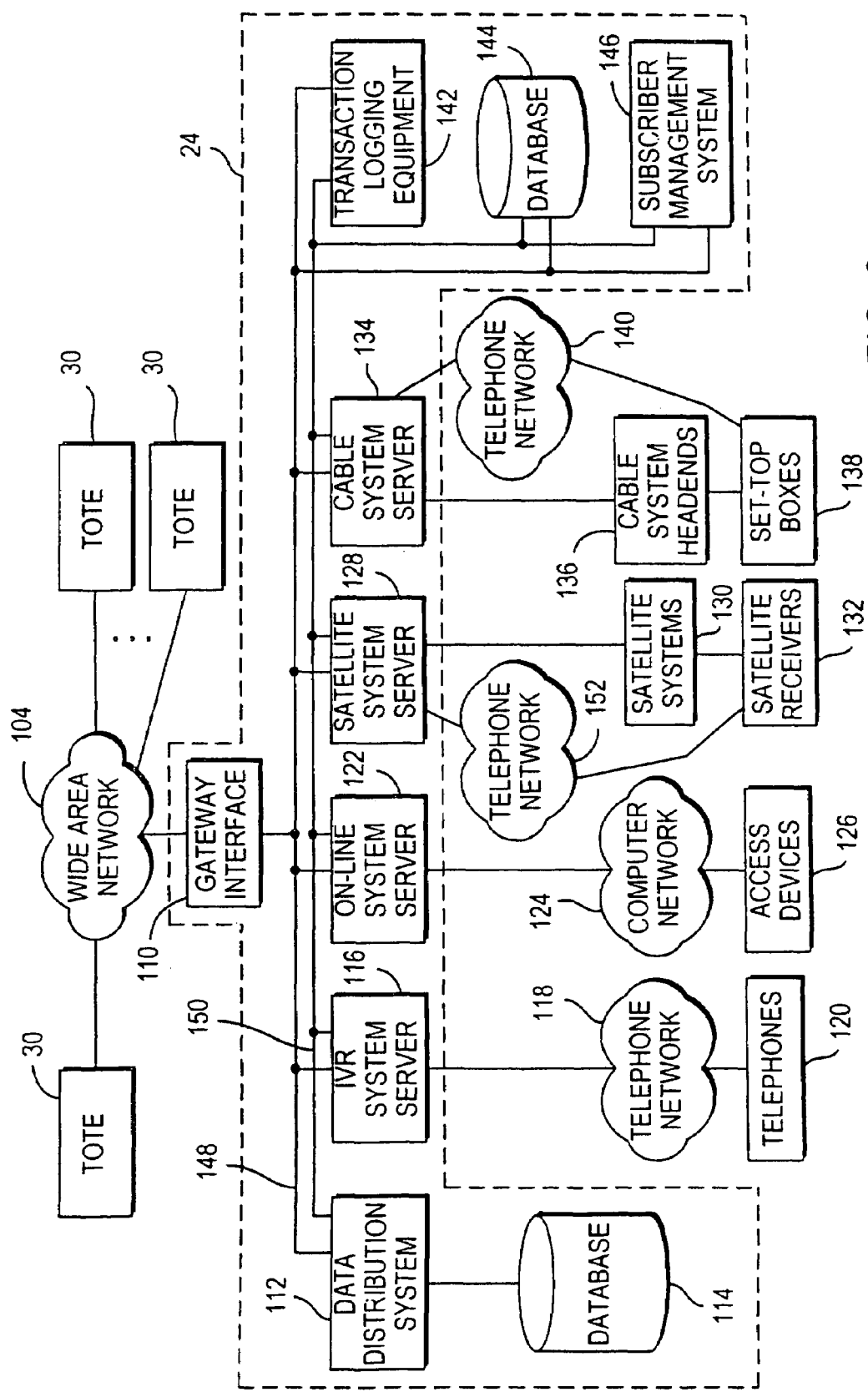
FIG. 2 is a schematic diagram of illustrative components of the transaction processing and subscription management system and other portions of the interactive wagering system of FIG. 1 in accordance with the present invention.

As shown in FIG. 2, transaction processing and subscription management system 24 may form a wagering data hub that connects various platforms through a wide area network 104 to multiple totes 30. Wide area network 104 may be any suitable data communication network, such as a frame relay network, the Internet, or any other suitable communications network or communications paths. Totes 30 may be tote computers (also referred to as totalizers or totalisators) associated with various tote companies.

Transaction processing and subscription management system 24 and its associated computer equipment 26 (FIG. 1) may include a gateway interface 110, a data distribution system 112, a database 114, an interactive voice response system server 116, an on-line system server 122, a satellite system server 128, a cable system server 134, transaction logging equipment 142, a database 144, a subscriber management system 146, and computer networks 148 and 150. Computer networks 148 and 150 may be used to connect data distribution system 112, interactive voice response system 116, on-line system server 122, satellite system server 128, cable system server 134, transaction logging device 142, database 144, and subscriber management system 146 to gateway interface 110. Computer networks 148 and 150 may each be dedicated to passing a specific type of data, may be dedicated to passing data in a specific direction, may be used for primary or backup roles, or may be used for any combination of such tasks. For example, network 148 may be used to deliver handicapping data and network 150 may be used to deliver wager data when both networks are operating and the loads on the networks are relatively balanced. However, when one network fails or becomes heavily loaded, some or all of the data on that network may be transferred to the other network. Networks 148 and 150 may be any suitable computer networks (e.g., Ethernet networks), and may be capable of sustaining high-speed data transfer rates. If desired, a single network or more than two networks may be used to support communications between the components of FIG. 2.

Data distribution system 112 and database 114 may be used in transaction processing and subscription management system 24 to store and distribute data relating to handicapping, wagers that have been placed, account balances, user preferences and default settings, user information, and other suitable data. Data distribution systems 112 and database 114 may be implemented using any suitable computer and database and may be implemented using a single device or using multiple devices.

Interactive voice response system server 116 may be any suitable device for presenting audible prompts (preferably in recorded or synthesized voice) to users and for receiving responses from the users through voice or telephone key depressions (e.g., using touch-tone or dual-tone multifrequency (DTMF) signals). Server 116 may be connected to telephones 120 through telephone network 118. Telephone network 118 and telephones 120 may be any suitable devices for communicating acoustically (i.e., using audio information) (at least in part) with users. For example, network 118 may be a traditional telephone network, a cellular telephone network, a radio network, or any other suitable communication network. Telephones 120 may be touch-tone telephones, rotary telephones, pay telephones, cellular telephones, handheld radios, or any other suitable communication devices.

On-line system server 122 may be used to allow users using access devices 126 (such as personal computers, personal digital assistants, or portable browsers) to receive wager and handicapping information and to place wagers. Access devices 126 may connect to on-line system server 122 through a computer network 124. Network 124 may be any suitable computer network, such as a private wagering network, a public network like the Internet, etc.

Satellite system server 128 may allow users using satellite receivers or satellite system integrated receiver decoders 132 to receive wager and handicapping information and to place wagers. Satellite receivers 132 may be connected to satellite system server 128 through satellite systems 130 and telephone networks 152, although telephone networks 152 may be omitted when satellite systems 130 support two-way communications. Satellite systems 130 may be any suitable satellite or wireless television system, such as DirecTV, Dish TV, etc. Telephone network 152 may be any suitable network for communicating data from integrated receiver decoders 132 to satellite system server 128, including telephone networks, data subscriber lines, the Internet, etc.

Cable system server 134 may allow users using set-top boxes 138 to receive wagering information and handicapping information and to place wagers. Set-top boxes 138 may be connected to cable system server 134 through cable headends 136 and telephone networks 140. If desired, telephone network 140 may be omitted when cable headends 136 and set-top boxes 138 support two-way communications. Cable headends 136 may be any suitable cable-system-based or telephone-system-based television distribution system. Telephone network 140 may be any suitable network for communicating data from set-top boxes 138 to cable system server 134, including telephone networks, data subscriber lines, the Internet, etc.

Transaction logging device 142 may be any suitable device for monitoring and logging transactions such as wagers, information requests, and any other desired information on networks 148 and 150. Device 142 may be a computer that listens for data on the networks, translates that data to an understandable format, and records that data on a computer disk drive or tape, or may be any other suitable equipment.

Database 144 may be any suitable database for direct access by other components of hub 102. Database 144 may be implemented with a general purpose computer using database software or in dedicated database equipment.

Subscriber management system 146 may be any suitable equipment for registering users, tracking user behavior, and accounting for the wins, losses, and balance of users. For example, system 146 may include equipment for processing credit card transactions, check transactions, wire money transfers, etc., and may include one or more operators who communicate with users to setup the user accounts. Subscriber management system 146 may also be configured to communicate with external facilities to perform these functions. For example, subscriber management system 146 may communicate with subscriber verification facilities such as subscriber verification facility 40 of FIG. 1, may communicate with financial institutions such as financial institutions 38 of FIG. 1, and may communicate with customer service facilities such as customer service facility 36 of FIG. 1.

Servers 116, 122, 128, and 134 may use communications software that allows the servers to communicate with totes 30, data distribution system 112, transaction logging device 142, database 144, subscriber management system 146. Such communications software may also be used to support communications between servers 116, 122, 128, and 134.

Illustrative software and functions that may be implemented on the equipment of transaction processing and subscription management system 24 and the other components of system 10 are described in Marshall et al. U.S. patent application Ser. No. 09/330,651, filed Jun. 11, 1999, which is hereby incorporated by reference herein in its entirety.

The interactive wagering application implemented on system 10 may be implemented using application software that runs primarily on user television equipment such as user television equipment 22 of FIG. 1, user computer equipment such as user computer equipment 20 of FIG. 1, user telephone equipment such as user telephone equipment 32 of FIG. 1, or any other suitable local platform, or that runs using a remote server or other computer that is accessed from the local platform. Arrangements in which interactive wagering services are implemented using software on remote computers that is accessed on-demand from local platforms may be referred to as client-server arrangements. Such client-server arrangements may be used to allow client processes set-top boxes or other platforms to access server processes running on servers located at cable system headends or other television distribution facilities 18 (FIG. 1). Regardless of the type of system architecture or platform used, the software that supports the interactive wagering service features described herein may be referred to as an interactive wagering application.

In a set-top box or satellite receiver environment, the system may allow the user to launch an interactive wagering application by selecting a menu option in an interactive television program guide or other set-top box application or menu. If desired, the interactive wagering application (or other application) may be launched automatically whenever the user tunes to a particular channel (e.g., the television wagering channel). After the user has tuned to this channel, the system may display an interactive icon on the user's television screen that indicates that the interactive wagering application is available. If the user presses an "OK" remote control key, the system may launch the application.

In a computer-based system, the user may access the interactive wagering application by browsing to an Internet web site or a site on a private network or by otherwise connecting to computing equipment such as computing equipment 26 of transaction processing and subscription management system 24 (FIG. 1) or other suitable computer equipment.

Systems based on cellular telephones or the like may be launched by selecting an appropriate on-screen menu option presented on the display of the cellular telephone.

Although typically only one tote company, and therefore only one tote computer (although more tote computers could also be used at a single tote company), accepts wagers for any giving wagering event occasionally more than one tote company will accept wagers for a popular event, such as the Kentucky Derby. The wagering system 10 may therefore be used to direct wagers to any one or more of the corresponding tote computers at the tote companies.

The wagering application of system 10 may automatically select a tote company for a particular wagering event, may allow a user to select a tote company for a particular wagering event, may present corresponding odds for wagering events at an automatically selected tote or at each tote that is selected by a user, may provide account information for one or more totes, may assist in managing a wagerer's balance at multiple totes, may facilitate the use of combined pools involving more than one tote to provide a cross-tote pool, and may support other functions related to using multiple totes.

A tote company may be automatically selected by the interactive wagering application based on any suitable factor. For example, when a wagering event occurring in a particular state is selected by a user, the interactive wagering application may only select a tote company that is licensed to accept wagers on events in that state. If desired, the interactive wagering application may select a tote that provides better odds for a wagering selection than the odds currently available at other totes. A tote may also be selected based upon the tax consequences of a particular wagerer selecting among various tote companies. The interactive wagering application may select the tote with the largest pool value, the smallest pool value, etc. A tote may be selected based upon a bulk benefit that will be granted for providing at least a certain number of wagers or at least a certain value of wagers. If desired, a tote may be selected based on factors such as user preference for a particular tote company, the type of wager (e.g., parimutuel vs. fixed odds) available from the totes, etc. Moreover, the interactive wagering application may select a tote based upon a combination of these factors any other suitable factors. For example, when three tote companies are available and two of the three share an attribute that make them more desirable than the remaining tote, an additional factor may be used to decide between these two desirable totes. Additional factors or criteria may be used if desired to help select a single tote at which to place wagers or to place a given wager, etc.

The interactive wagering application may allow users to manually select a tote company. For example, a user may be provided with pertinent information relating each of multiple totes that are available. The user may then select from these totes. A user may, for example, be provided with options that allow the user to select a tote based upon odds, tax consequences, pool values, a bulk benefit or any other factors.

When a user selects a desired option, the user may be presented with the relevant data for the option for each tote from which the user can select. If desired, the data for all of the options may be presented to the user in a spreadsheet or other suitable arrangement.

A combination of automatic and manual tote selection techniques may also be used. For example, the user may first apply a first factor or criteria when selecting from the available totes. The interactive wagering application may then automatically apply a second factor or criteria. If desired, the interactive wagering application may automatically apply a first factor and then the user may manually apply a second factor.

In order to enable a user to determine whether odds for an automatically selected tote are acceptable (assuming the tote is selected before a wager is placed) or to notify a user of the odds received (assuming the tote is selected after a wager is placed—in which case the user may be informed of minimum or average odds before placing a wager), the interactive wagering application may provide the odds for the selected tote to the user. In the case where the user may manually select one of the totes, the user may be presented with a list of the odds for each available tote.

Separate accounts may be established for the user at each tote with which the user desires to wager. The interactive wagering application may enable account information for a user with multiple tote accounts to be displayed on demand. The interactive wagering application may automatically manage the funds in the accounts of the users at all of the tote companies being used. With this type of arrangement, if a user has no funds in an account at a give tote at which the wagerer would like to place a wager, the system may automatically transfer money from a tote account at which the user has funds to the given tote.

The interactive wagering application may support cross-pool totals. Data for pools at each tote may be gathered in real time by the system. The system may then mathematically combine the pools together to provide a cross-tote pool. The system may present cross-tote pool odds to the user. When the user places a wager the system may place proper wagers with each of the individual totes that participated in the cross-tote pool. Cross-tote pool arrangements allow users to access larger pools of wagers than if only a single tote's pool were available. Such arrangements may also be beneficial to tote companies, because they may be used to prevent users from "tote shopping" (i.e., seeking the tote with the best odds).

Figure 3:
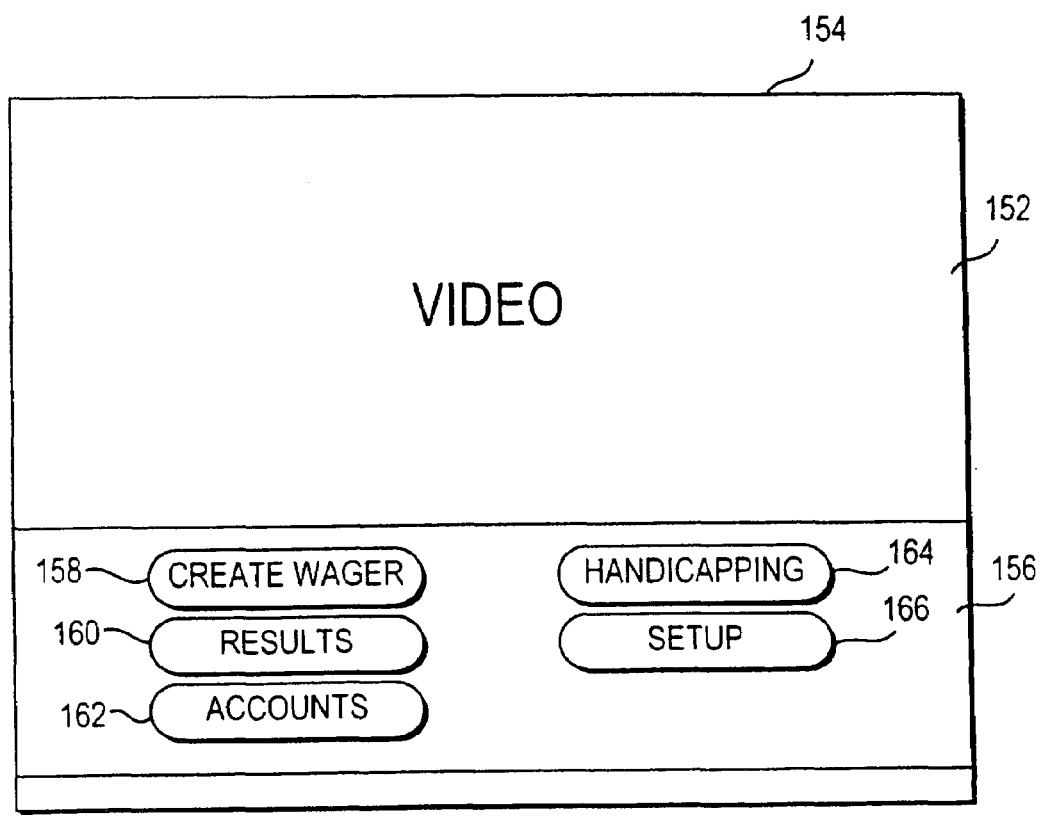
FIG. 3 shows an illustrative screen that may be displayed to provide the user with an interactive wagering service menu in accordance with the present invention.

An illustrative menu arrangement that may be used by the user to access the interactive wagering application is shown in FIG. 3. Initially, the user may be viewing a video on the user's equipment (e.g., user television equipment 22, user computer equipment 20, or user telephone equipment 32). For example, the user may be viewing a racing-related television program on a racing-related television channel. A full-sized racing-related video 152 may be displayed on screen 154. Screen 154 may contain a menu region 156. Menu region 156 may be provided as an overlay on top of video 152, may be provided in a wrap-around arrangement surrounding video 152 in a reduced-size window, or may be displayed on screen 154 using any other suitable configuration. Menu 156 may contain a user-selectable option 158 that the user may select when the user desires to create a wager. Option 160 may used to access race results. Option 162 may be used to access information on the user's accounts at various totes or an account associated with the provider of the interactive wagering service or the like. Handicapping option 164 may be selected when the user desires to obtain handicapping information. Setup option 166 may be selected when the user desires to adjust settings in the interactive wagering application.

Figure 4:
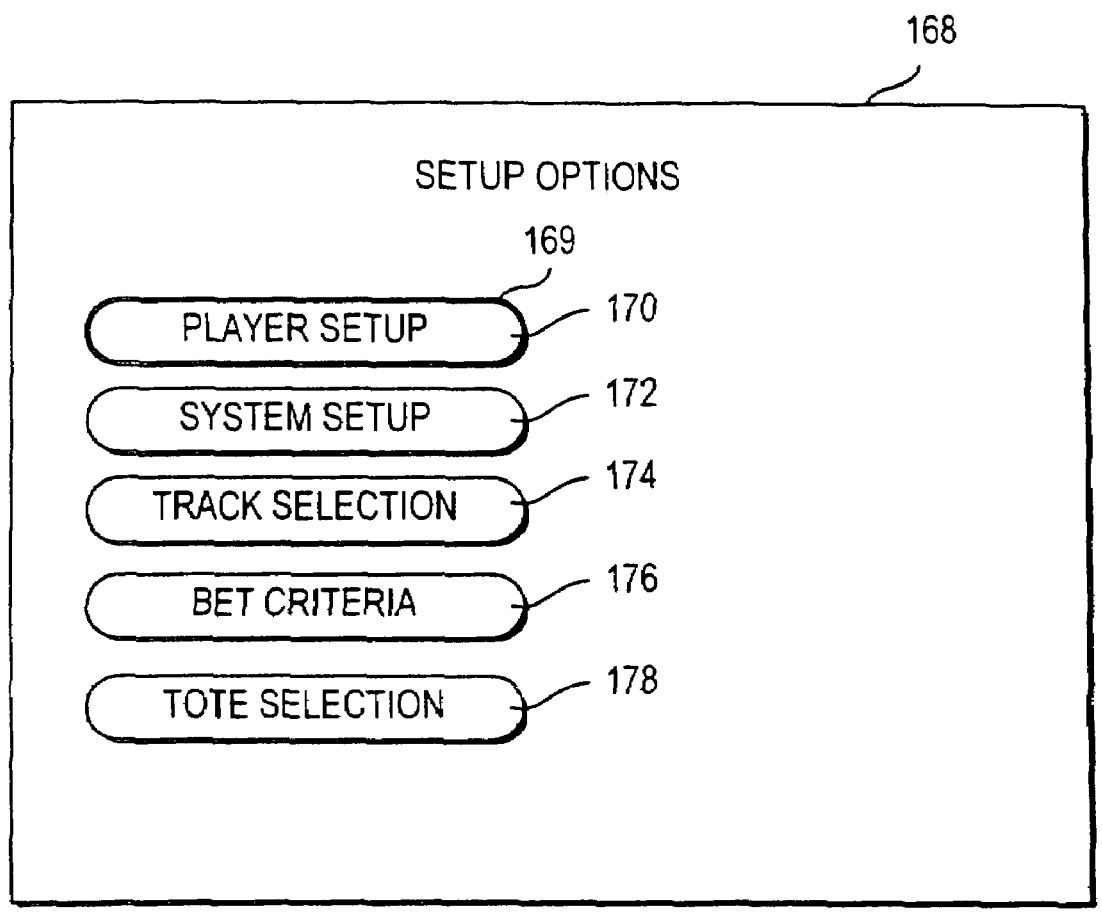
FIG. 4 shows an illustrative setup options screen that may be displayed for the user in accordance with the present invention.

An illustrative screen 168 that may be provided when the user invokes the setup function of the interactive wagering application (e.g., by selecting option 166 of FIG. 3 or the like) is shown in FIG. 4. The user may use remote control arrow keys to position highlight region 169 on top of a desired option. An option may be selected by pressing a remote control OK key or the like once the desired option has been highlighted.

Setup options screen 168 may include player setup option 170. The user may use player setup option 170 to manage functions relating to different users. For example, option 170 may be used to add a new user, to delete a user, to change passwords, etc.

System setup option 172 may be used to configure system parameters such as equipment settings, security settings, etc.

Track selection option 172 may be used to establish user-defined or default tracks.

Option 176 may be used to set up default bet settings.

Tote selection option 178 may be used to access options that allow the user to select a desired tote.

Figure 5:
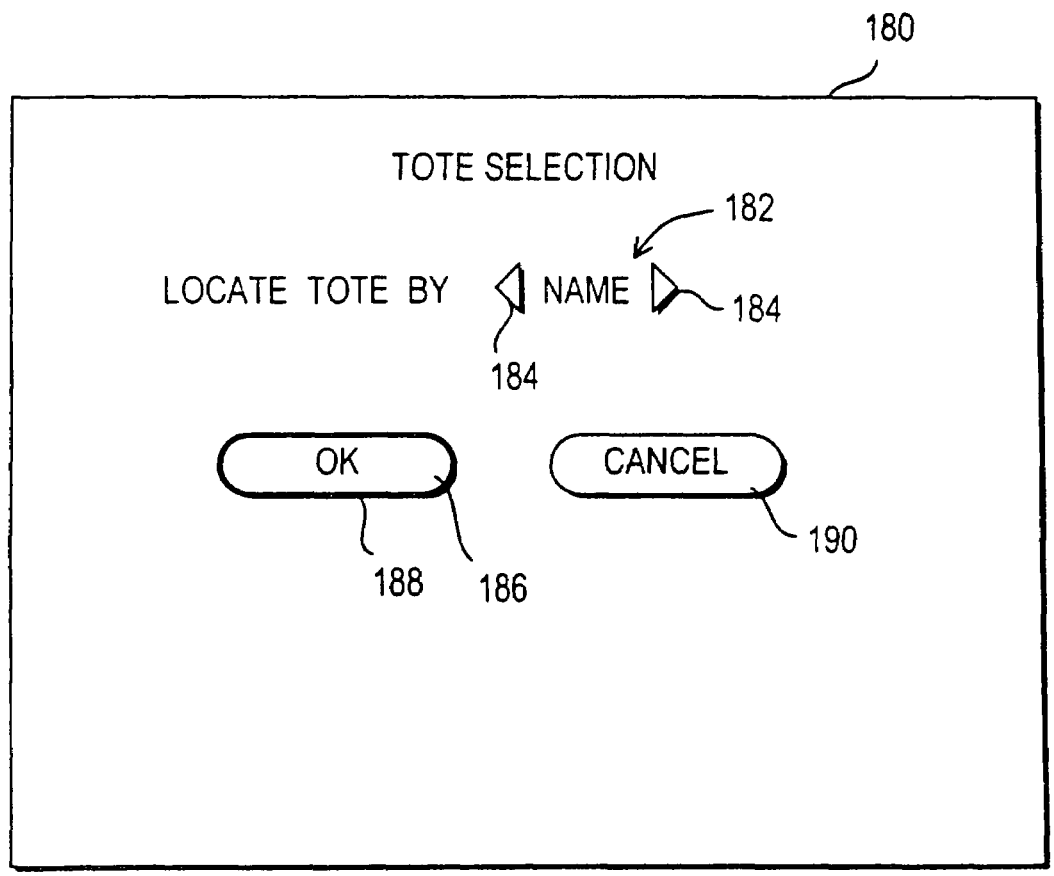
FIG. 5 shows an illustrative tote selection screen that may be displayed for the user to provide the user with an opportunity to select a desired approach for selecting a totalisator in accordance with the present invention.

An illustrative tote selection screen 180 that may be displayed for the user when the user selects option 178 of FIG. 4 is shown in FIG. 5. Screen 180 may contain an option such as option 182 that allows the user to select a desired method for selecting a tote for placing wagers. As indicated by arrows 184, the user may select the desired tote selection method using right and left remote control arrow keys. When a desired method is displayed, the user may select that method by placing highlight region 188 on OK option 186 and pressing a remote control OK key or the like. The user may cancel the display of screen 180 by selecting cancel option 190.

Option 182 may be used to select any suitable tote selection method. If desired, totes may be selected based on tote name, tote location, which totes provide the best average odds or the best odds for a particular wager or wagers, which totes accept certain wagers or types of wager, or any other suitable criteria.

Figure 6:
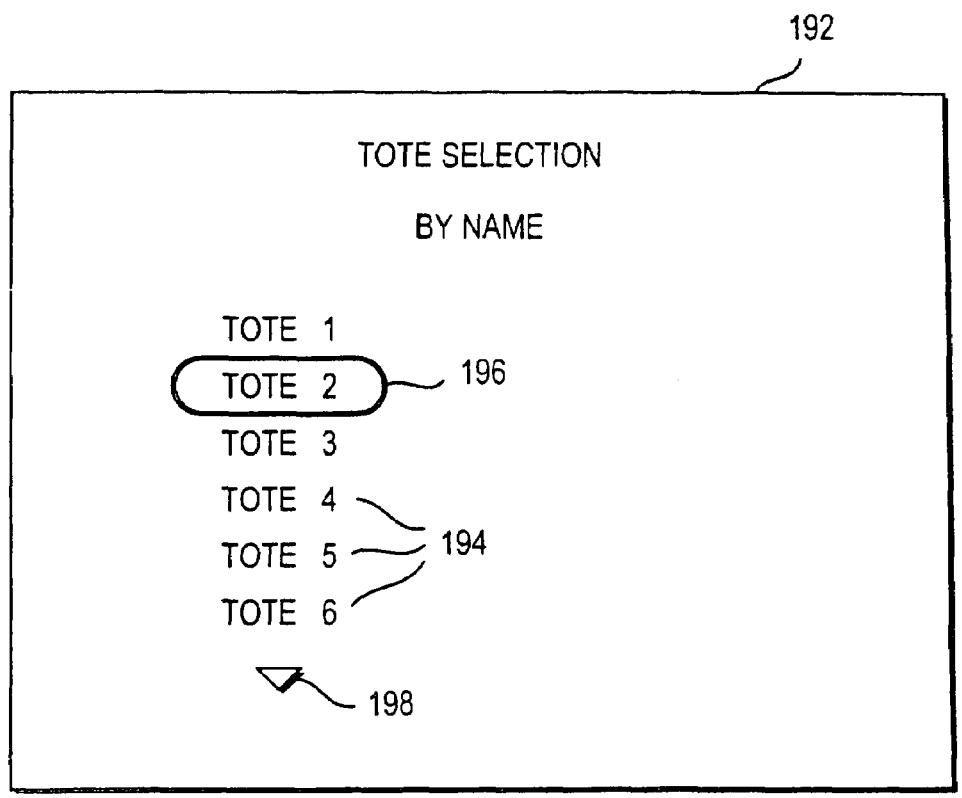
FIG. 6 shows an illustrative tote selection menu that may be provided for the user to allow the user to select a desired tote by name in accordance with the present invention.

If the user chooses to select a desired tote by name (e.g., by selecting "name" with option 182), the interactive wagering application may display a screen such as screen 192 of FIG. 6. Screen 192 of FIG. 6 may contain a list of tote names 194. The user may select a desired tote using highlight region 196. As indicated by arrow 198, the user may scroll down to access additional tote names using a remote control down arrow key or the like. Once the user has chosen a tote, that tote may be used to handle the user's wagers. If desired, selecting a tote during setup may establish a default tote selection that may be used for all wagers until overridden by the user.

Figure 7:
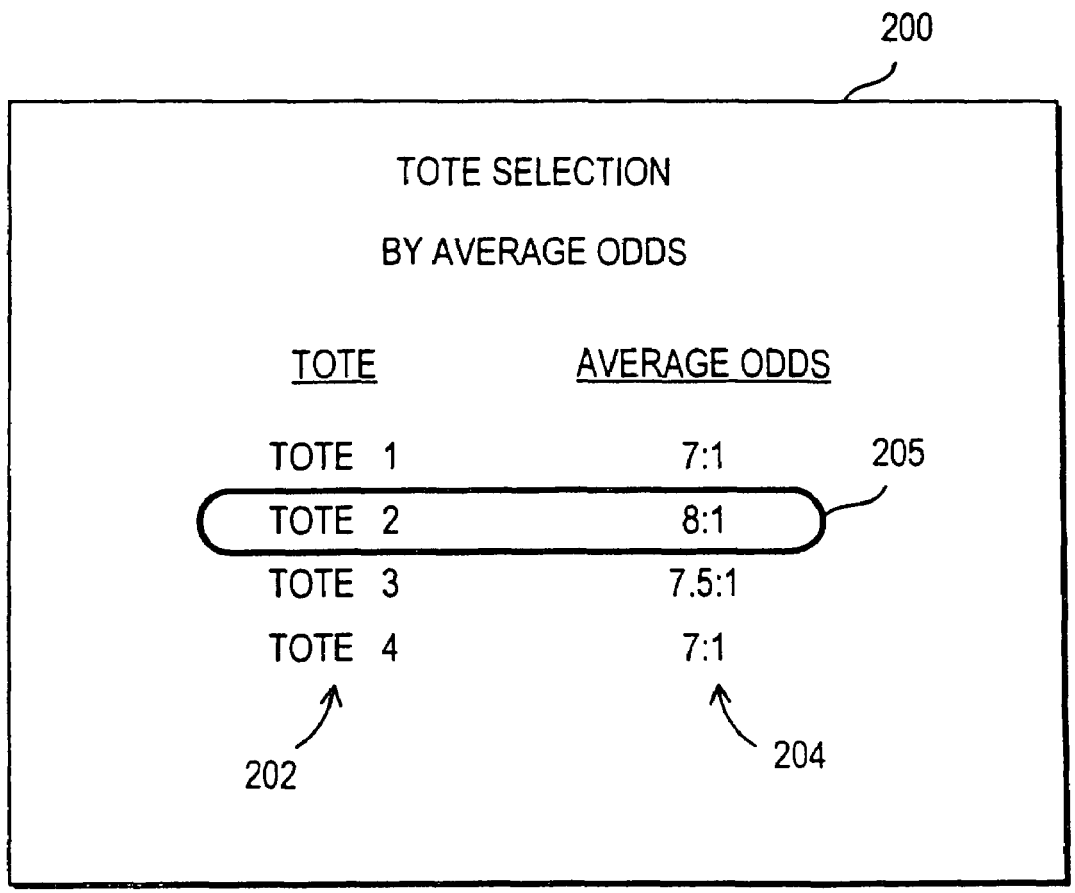
FIG. 7 shows an illustrative tote selection screen that may be presented for the user when the user is selecting a desired tote based on the odds provided by each tote in accordance with the present invention.

In the example of FIG. 6, the user was provided with a screen that allowed the user to select a desired tote by the name of the tote. Another way in which the tote may be selected is based on average odds. An illustrative screen 200 that may be displayed for the user when the user uses an option such as option 182 of FIG. 5 to direct the interactive wagering application to allow the user to select a desired tote by the average odds is shown in FIG. 7. Screen 200 may include a list of tote names 202. Each tote may have associated odds information 204. Odds information 204 may be any suitable information on the odds provided by the corresponding tote. For example, odds information 204 may be the most recent win odds provided for a particular horse or race, the average win odds provided for all horses in all races, the average of all odds on all wager types for all races for a particular time period (e.g., the last month, etc.) or any other suitable normalized basis for making a comparison between the odds offered by one tote and the odds offered by another tote. If desired, the odds information may be a rating that is assigned to the tote by a ratings service. The rating may reflect whether the odds are viewed as good, very good, or excellent odds, etc. The user may select a desired tote based on the odds information using highlight region 205.

Figure 8:
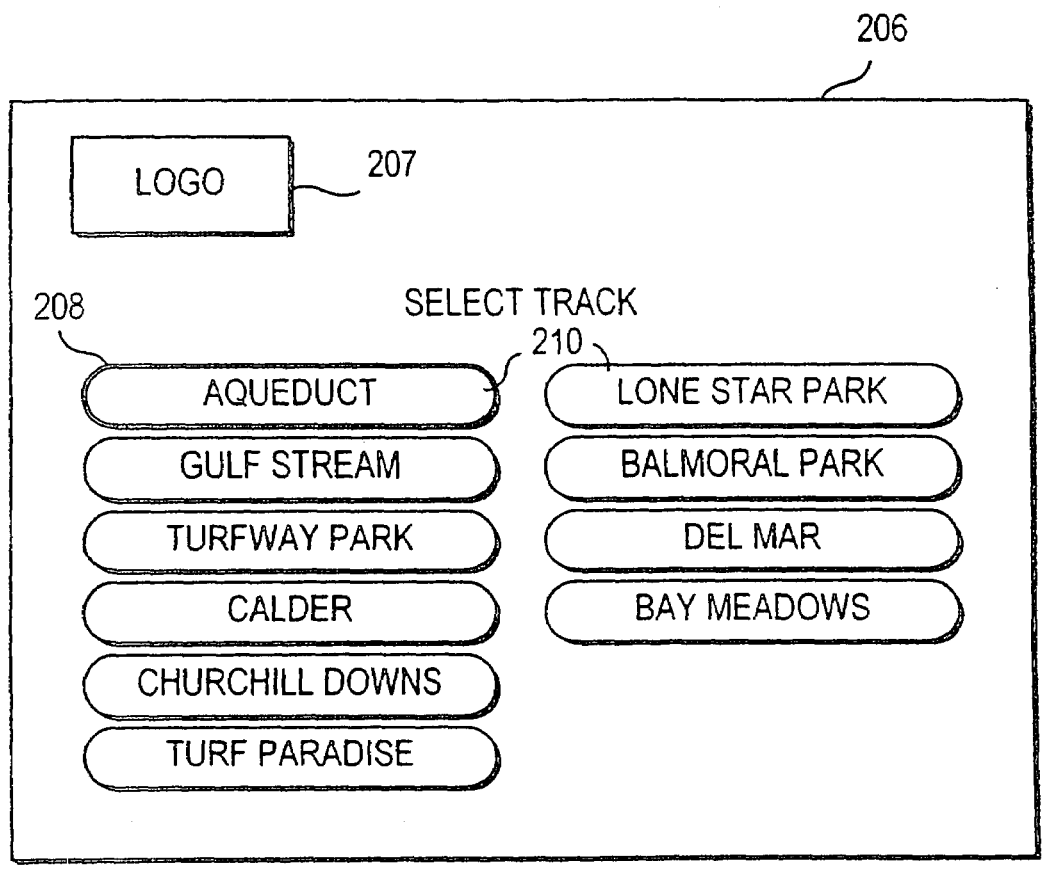
FIG. 8 shows an illustrative track selection screen that may be displayed for the user to allow the user to select a desired racetrack for a wager in accordance with the present invention.

If the user desires to create a wager, the user may select an option such as create wager option 158 of FIG. 3. An illustrative-track selection screen 206 that may be provided for the user when the user selects option 158 is shown in FIG. 8. Screen 206 and the other screens provided by the interactive wagering application may have a logo 207 and other information. For example, wager creation screens such as the track selection screen of FIG. 8 and other such screens may include a "wager ticket" that represents the wager that the user is building in a way that visually resembles a printed race ticket. The user may select a desired racetrack for the user's wager by selecting an appropriate option 210 with highlight region 208.

Figure 9:
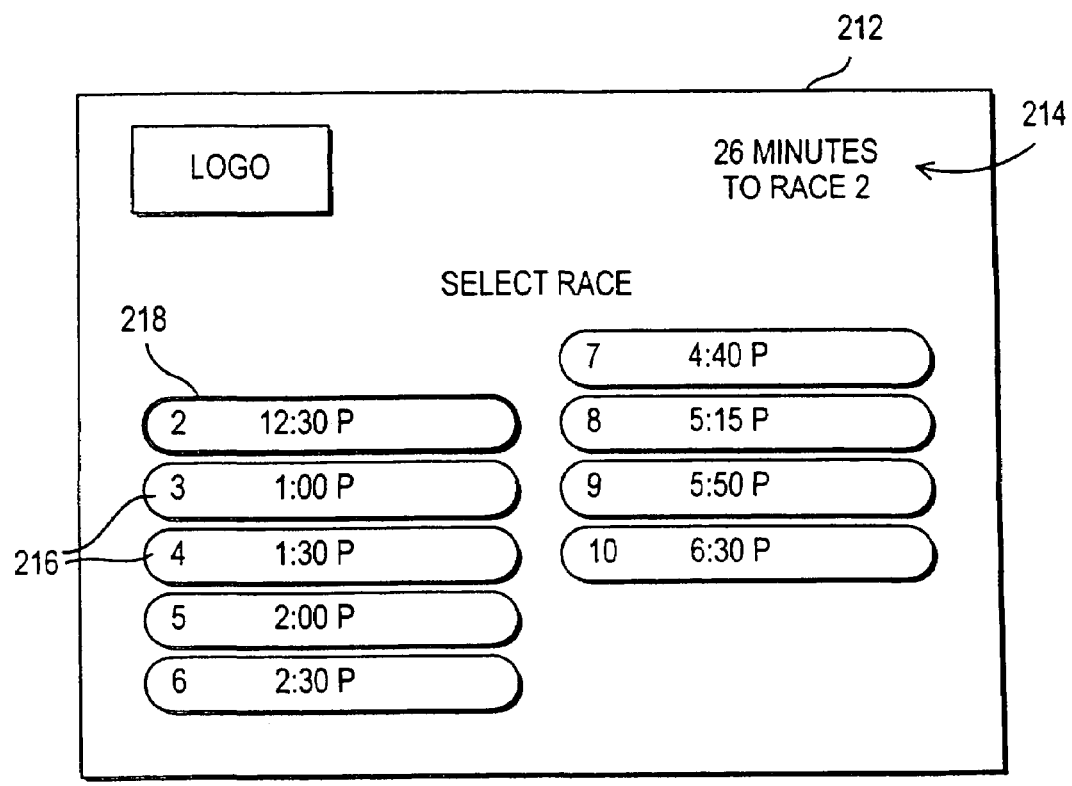
FIG. 9 shows an illustrative race selection screen that may be displayed for the user to allow the user to select a desired race for the wager in accordance with the present invention.

After the user has selected a desired racetrack, the interactive wagering application may display a race selection screen to the user. An illustrative race selection screen 212 is shown in FIG. 9. Screen 212 may contain information 214 on the time until the next scheduled race. The user may select a desired race for the wager by selecting one of race options 216 using highlight region 218.

Figure 10:
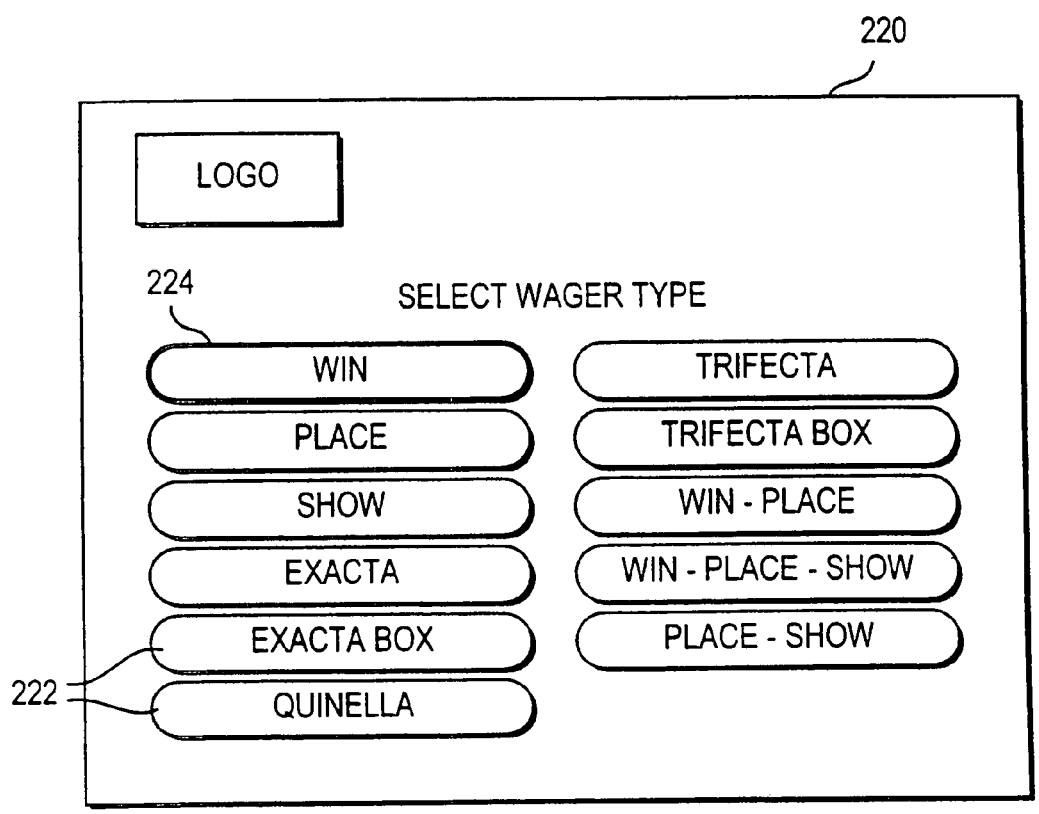
FIG. 10 shows an illustrative wager type selection screen that may be displayed for the user to allow the user to select a desired wager type for the wager in accordance with the present invention.

When the user has selected a race, the interactive wagering application may display a wager type selection screen such as wager type selection screen 220 of FIG. 10. Wager type selection screen may contain a number of wager type option 222. The user may select a desired wager type using highlight region 224.

Figure 11:
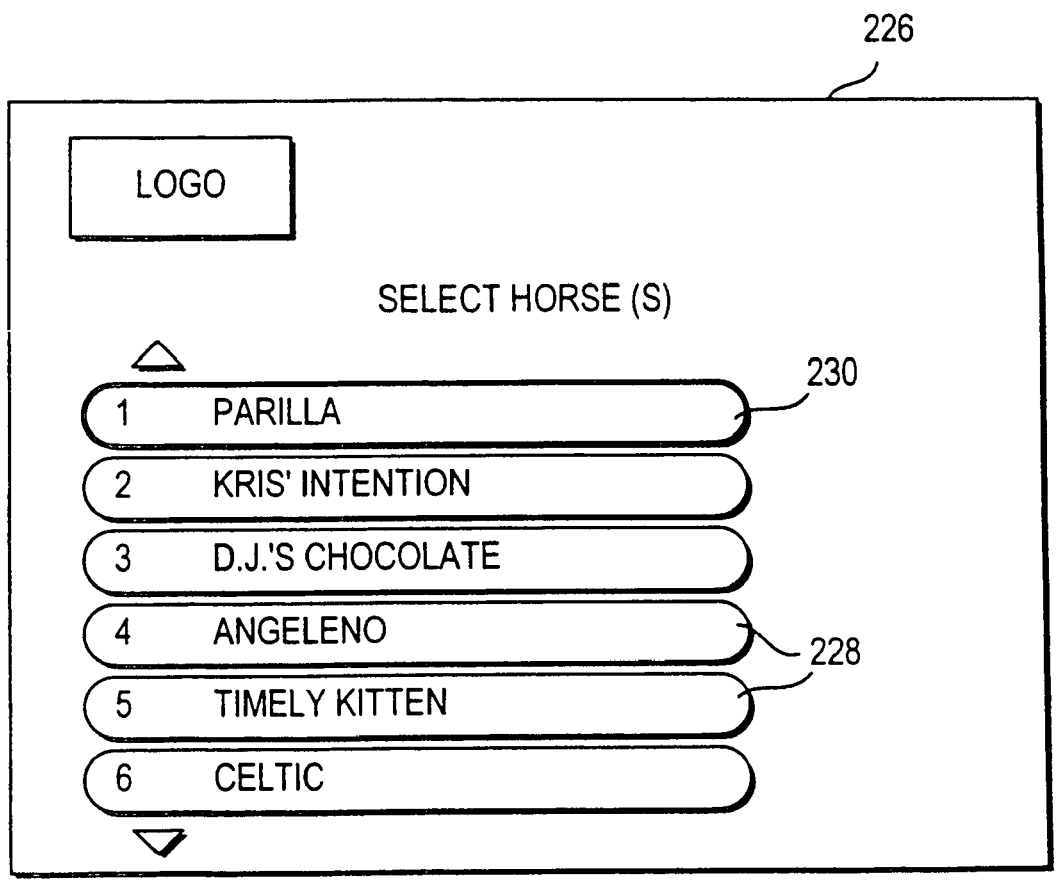
FIG. 11 shows an illustrative horse selection screen that may be displayed for the user to allow the user to select a desired horse for the wager in accordance with the present invention.

The interactive wagering application may display a horse selection screen to the user after the user has selected a wager type. An illustrative horse selection screen 226 is shown in FIG. 11. The user may select one or more horses for the wager by selected desired horse option 228 using highlight region 230. If the user is creating a win wager or other wager that involves a single horse, the user may complete the horse selection process by selecting a single horse. When the user is creating a wager such as an exacta wager that requires the selection of multiple runners, the user is required to select each of the multiple runners for the wager.

Figure 12:
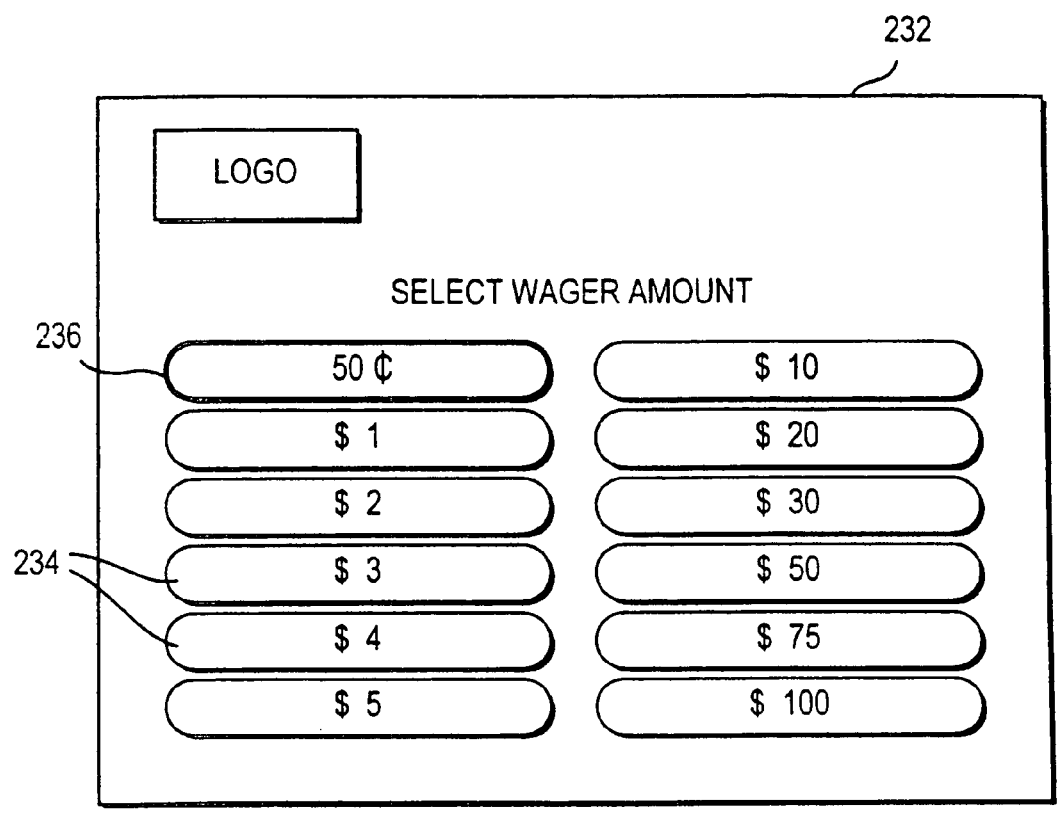
FIG. 12 shows an illustrative wager amount selection screen that may be displayed for the user to allow the user to select a desired wager amount for the wager in accordance with the present invention.

When the user has finished selecting the horses for the wager with screen 226, the interactive wagering application may present the user with a screen such as wager amount selection screen 232 of FIG. 12. Screen 232 may include options 234 from which the user may select a desired wager amount using highlight region 236.

Figure 13:
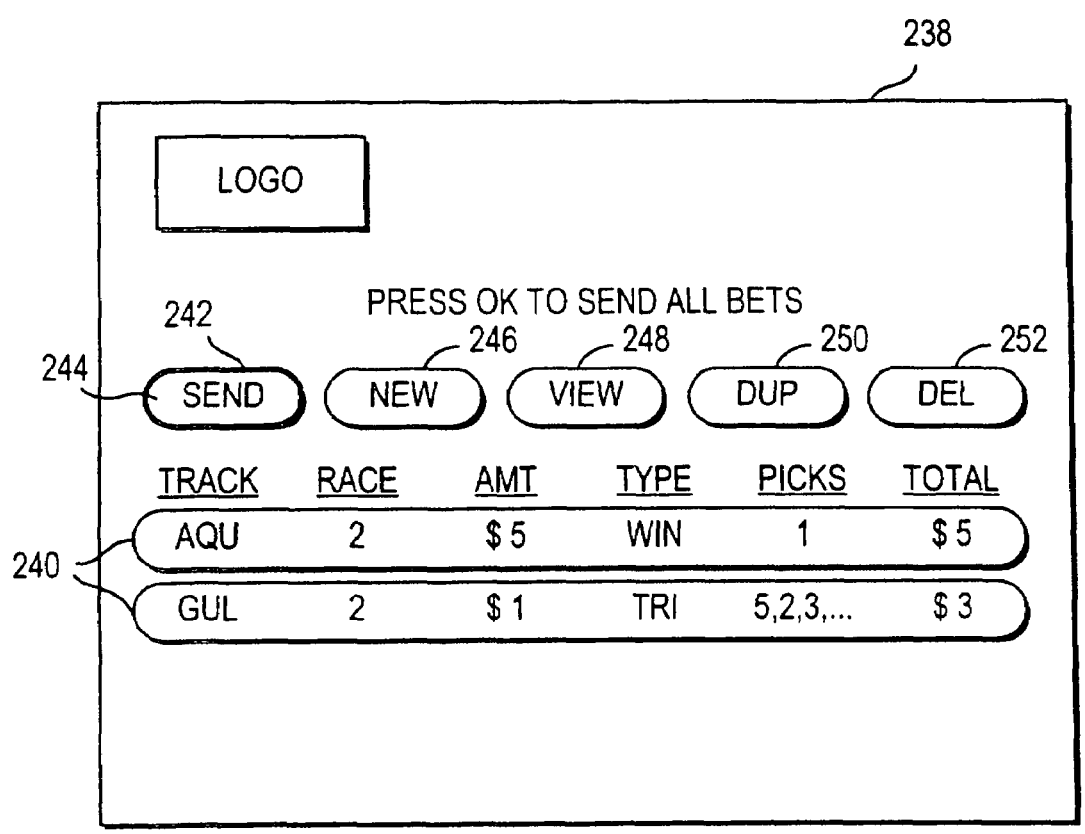
FIG. 13 shows an illustrative wager queue screen that may be displayed for the user to allow the user to submit wagers and to perform other wagering-related functions in accordance with the present invention.

When the user has selected the wager amount for the wager, the interactive wagering application may display a screen for the user such as wager queue screen 238 of FIG. 13. Screen 238 may contain a queue 240 of the wagers that have been created by the user but that have not yet been submitted to transaction processing and subscription management system 24. Information may be provided on the track for the wager. Information may also be provided on the race, the wager amount, the wager type, the runners, and the total cost of each wager. The user may select from various options using highlight region 242. Option 244 may be selected to send the wagers in the wager queue. Option 248 may be selected to create a new wager. The user may select view option 248 to view additional details on the wagers in the wager queue. Option 250 allows the user to duplicate a wager. Option 252 allows the user to delete a wager. When the user selects an option such as option 248, 250, or 252, the interactive wagering application may display a highlight region on the wagers in the wager queue. The user may position the highlight region using remote control arrow keys or the like to designate which wager is to be used in performing the function associated with the selected option.

If desired, the user may be provided with an opportunity to select a desired tote for a particular wager or for the wagers in the wager queue. For example, when the user selects send option 244 of FIG. 13, the interactive wagering application may display a screen such as screen 254 of FIG. 14. Screen 254 may contain a list 256 of various available totes for the user's wager or wagers. Odds information 258 may also be provided. The user may select a desired tote based on the odds information using highlight region 260.

If the user has only one wager in the wagering queue, odds information 258 may include information on the odds for that wager at each of the different totes. This allows the user to select a tote based on which tote offers the best odds for the wager. If the user has multiple wagers in the wager queue, the odds information 258 may be a weighted average of the odds available at each-tote. For example, the odds information may be an average of the odds for the user's wagers that is weighted based on the dollar amount of each wager. This is merely illustrative. Any suitable weighting arrangement may be used.

Figure 14:
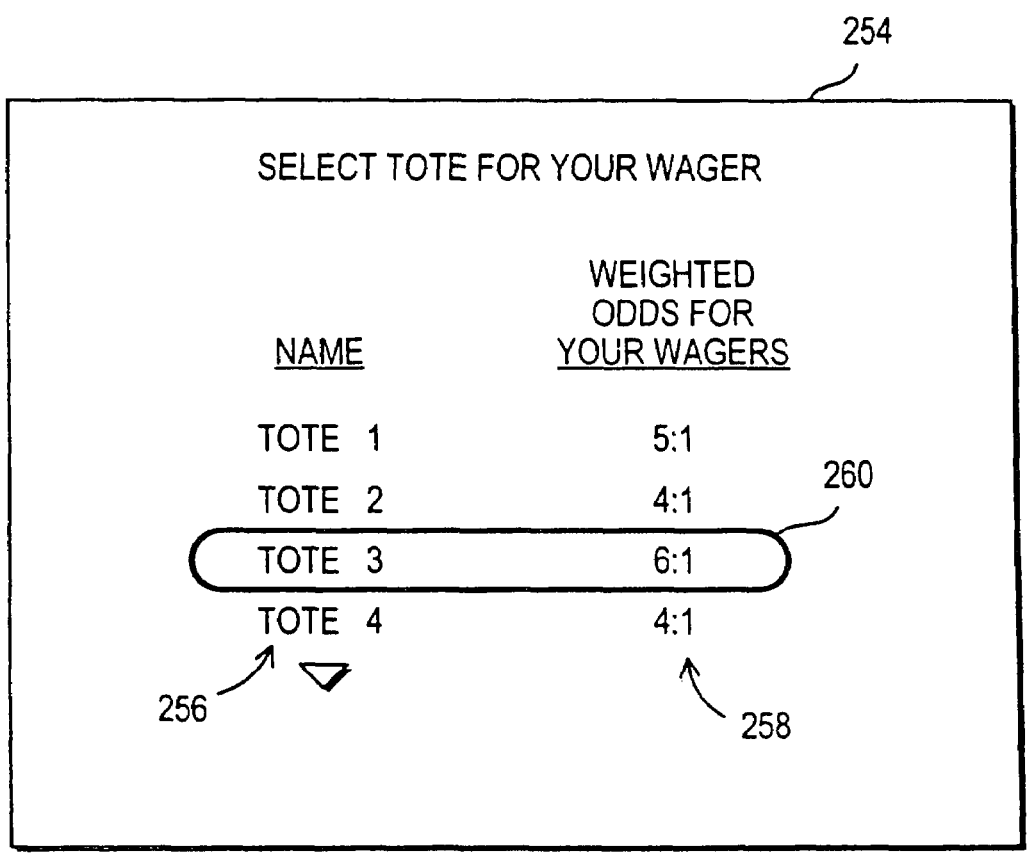
FIG. 14 shows an illustrative screen that may be displayed for the user when the user chooses to send a wager in the user's wager queue or the like in accordance with the present invention.

After the user has used highlight region 260 of FIG. 14 to select a desired tote, the interactive wagering application may submit the wagers in the user's wagering queue to transaction processing and subscription management system 24, which may then associate the placed wagers with the selected tote. If a wager is successful, the user's account at the selected tote may be credited, the selected tote may credit the user's winnings to a central account maintained by transaction processing and subscription management system 24, or any other suitable arrangement may be used to credit the winnings to the user. If the wager is unsuccessful, the user's account at the selected tote may be debited, the user's losses may be debited from a central account maintained by transaction processing and subscription management system, or any other suitable arrangement may be used to debit the user.

If desired, the user may be presented with a screen such as screen 254 before the user is presented with screen 238 of FIG. 13 or at any other suitable time (e.g., at any suitable time after the user has created one or more wagers).

Figure 15:
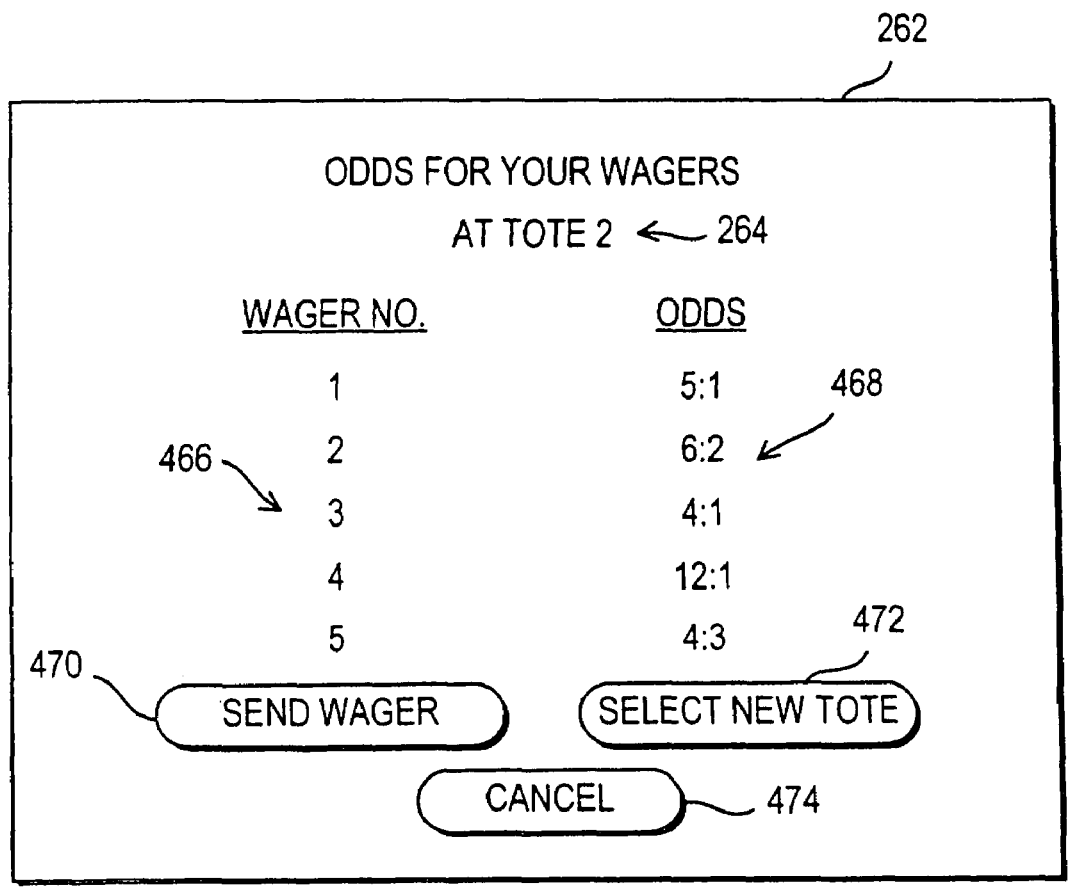
FIG. 15 shows an illustrative screen that may be displayed for the user to allow the user to view the current odds offered by a selected tote for each of the user's wagers in accordance with the present invention.

If the user has created multiple wagers, the interactive wagering application may display a screen such as screen 262 of FIG. 15. Screen 262 may be displayed, for example, after the user has selected a tote of interest using highlight region 260 of FIG. 14. Screen 262 may include information 264 that identifies the tote that the user has tentatively selected for placing the user's wagers. A list 466 of each of the user's wagers may also be provided. If desired, list 466 may include information such as the information in the wager queue of FIG. 13. Odds information 468 may also be provided for each wager. Odds information 468 allows the user to evaluate the current available odds being offered by the tote indicated by information 264 for each of the user's individual wagers.

If the user wishes to submit the wagers using the tote identified by information 264, the user may select send wager option 470. If the user decides to select a different tote, the user may select option 472. Option 474 may be selected when the user desires to cancel the display of screen 262 (e.g., to return to television viewing).

If desired, a spreadsheet-type (grid) arrangement or the like may be used to simultaneously present many of the statistics related to tote selection to the user. An illustrative arrangement of this type is shown in FIG. 16. In the example of FIG. 16, screen 476 may include a list 478 of various totes that are available for the user's wagers. Odds information 480 or other suitable wager-related information may be presented to the user. Odds information 480 may, for example, include information on the current odds each tote is offering on the first wager in the user's wager queue.

If desired, screen 476 may include information 482 that relates to the tax status of each tote. Information 482 may, for example, indicate whether taxes (including user fees or the like) will be levied on the user's wager for each tote, what the tax rate (or fees) would be at that tote, or any other suitable information regarding the tax consequences of placing a wager at each tote. Information 484 may also be provided regarding the pool values associated with the various totes. The information displayed on screen 476 is merely illustrative. Any suitable information may be displayed for the user to allow the user to make an informed decision regarding which tote to select. The user may use highlight region 486 to select a desired tote based on the information provided in screen 476.

If desired, the interactive wagering application may automatically select a tote for the user. The interactive wagering application may automatically select the tote to satisfy the user's interests, to satisfy the interests of the provider of the interactive wagering service, etc.

Figure 17:
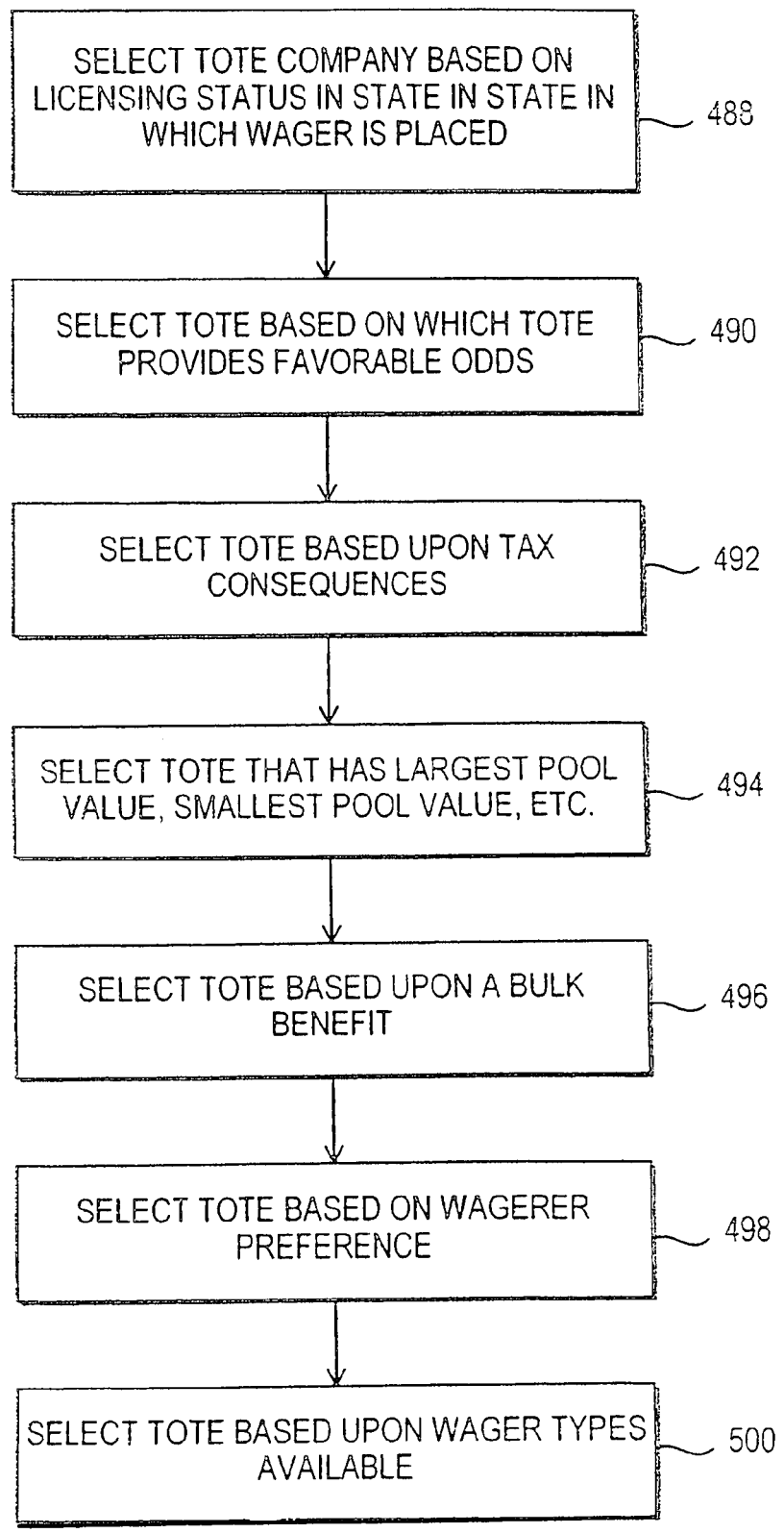
FIG. 17 is a flow chart of illustrative steps involved in automatically selecting a tote to use for handling the user's wagers in accordance with the present invention.

Illustrative steps involved in using the interactive wagering application to automatically select a tote are shown in FIG. 17. The steps of FIG. 17 may be performed by the interactive wagering application in any suitable order. If desired, some of the steps may be eliminated or bypassed.

At step 488, the interactive wagering application may automatically select the a tote company based on licensing status. For example, if the user is located in a state in which only certain totes are licensed to accept wagers, this criteria may be used to automatically select a tote.

At step 490, the interactive wagering application may automatically select a-tote based on which tote provides the most favorable odds. For example, when the user has created a wager and selected a send option such as send option 244 of FIG. 13, the interactive wagering application may automatically select a tote that has the highest odds for the wagers listed in the user's wager queue.

At step 492, the interactive wagering application may automatically select a tote based on the tax consequences associated with wagering at each tote. If, for example, two totes offer similar odds, the interactive wagering application may choose between the two totes based on whether the user's winnings will be taxed or not, whether the taxes will be high or low, etc.

At step 494, the interactive wagering application may automatically select the tote based on the value of the wagering pool associated with each tote. For example, the user may automatically select a tote that has the largest pool value, that has the smallest pool value, or that satisfies any other suitable pool value criteria.

At step 496, the interactive wagering application may automatically select a tote based upon a bulk benefit. For example, the interactive wagering application may select a tote when it is determined that a benefit will be granted (e.g., to the provider of the interactive wagering application) for providing at least a certain number of wagers or at least a certain value of wagers to that tote.

At step 498, the interactive wagering application may automatically select a tote based on the user's preference. For example, if the user has expressed an interest in a particular tote (e.g., by placing wagers with that tote frequently), the interactive wagering application may select that tote.

At step 500, the interactive wagering application may automatically select a tote based on the availability of particular wager types. For example, if the user has a quinella wager in the user's wager queue, the interactive wagering application may automatically select a tote based on whether or not the tote permits quinella wagers. Totes that do not support quinella wagers (for example) would not be selected.

If desired, the steps of FIG. 17 may be used in any suitable combination or may be used in combination with manual selection steps.

Figure 18:
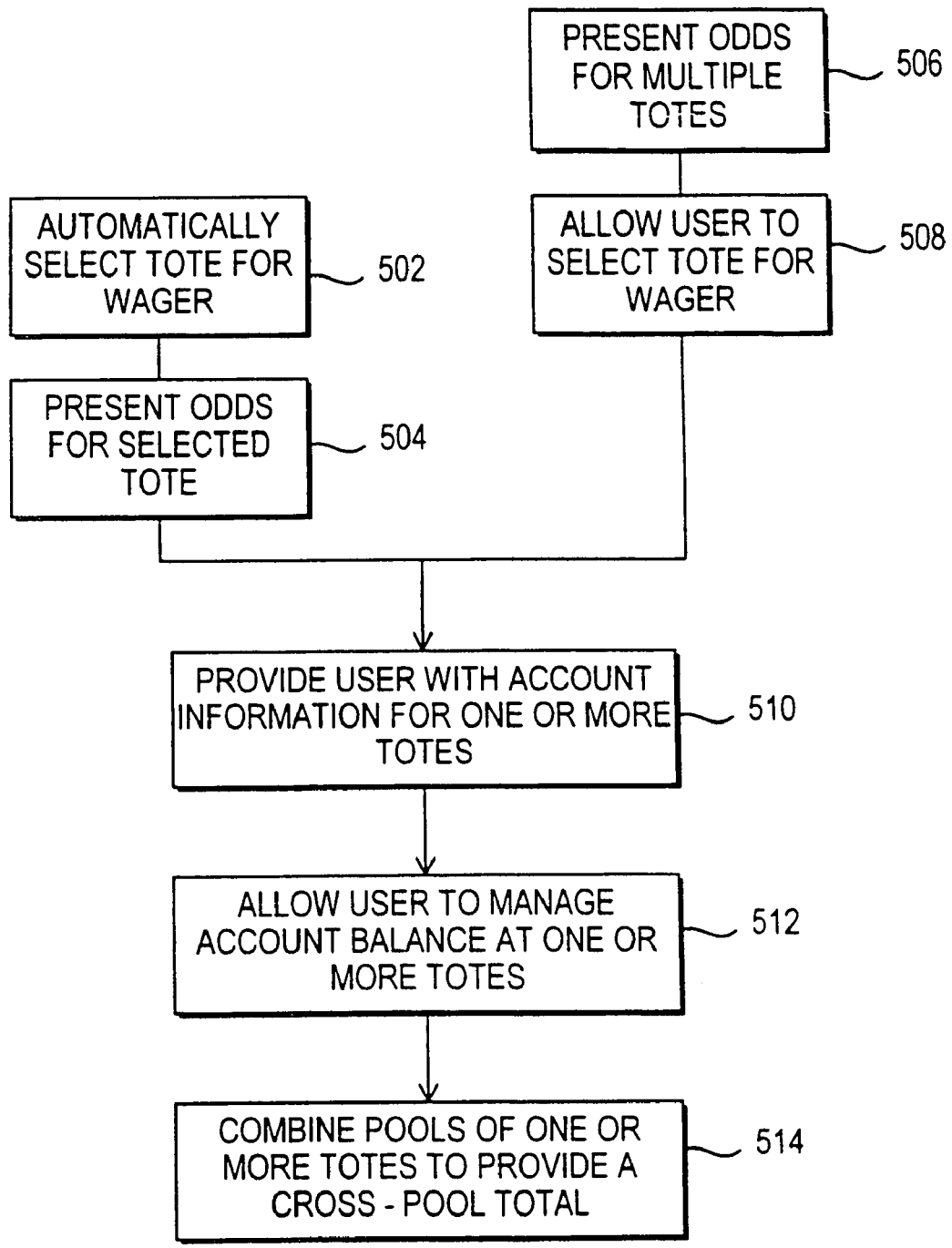
FIG. 18 is a flow chart of illustrative steps involved in using the interactive wagering system to support multiple-tote features in accordance with the present invention.

Illustrative steps involved in using an interactive wagering application that supports wagering with multiple totes are shown in FIG. 18. At step 502, the interactive wagering application may automatically select a tote or totes that are acceptable (e.g., that are acceptable for the user's wager or wagers or that are generally acceptable). Step 502 may involve automatic selection steps such as the steps of FIG. 17.

At step 504, odds and other wagering-related information for the selected tote may be presented. For example, a screen containing a list of tote names and corresponding odds information may be displayed for the user. The odds information may include averaged odds information, odds information for the user's particular wagers, etc.

If desired, the user may manually select a tote. At step 506, the user may be presented with odds information or other wagering information that is associated with particular totes. The odds information may include averaged odds information, odds information for the user's particular wagers, etc. At step 508, the interactive wagering application may provide the user with an opportunity to select a tote. For example, the user may be provided with an opportunity to select a tote for a particular wager or wagers based on information on the odds or other racing statistics for the race that are displayed at step 506.

The user may have accounts at different totes. At step 510, the interactive wagering application may be used to provide the user with account information for one or more of such totes. The interactive wagering application may help in maintaining these accounts at step 512.

At step 514, the interactive wagering application or other service associated with the system may be used to combine pools from one or more totes to provide a cross-pool total. The transaction processing and subscription management system 24 or other suitable equipment may be used to administer the combined pool.

The interactive wagering application may select totes automatically and separately from the user who may manually select totes. If desired, automatic and manual selection may be combined. The automatic selection and manual selection of totes may involve the application of certain selection criteria.

Figure 19:
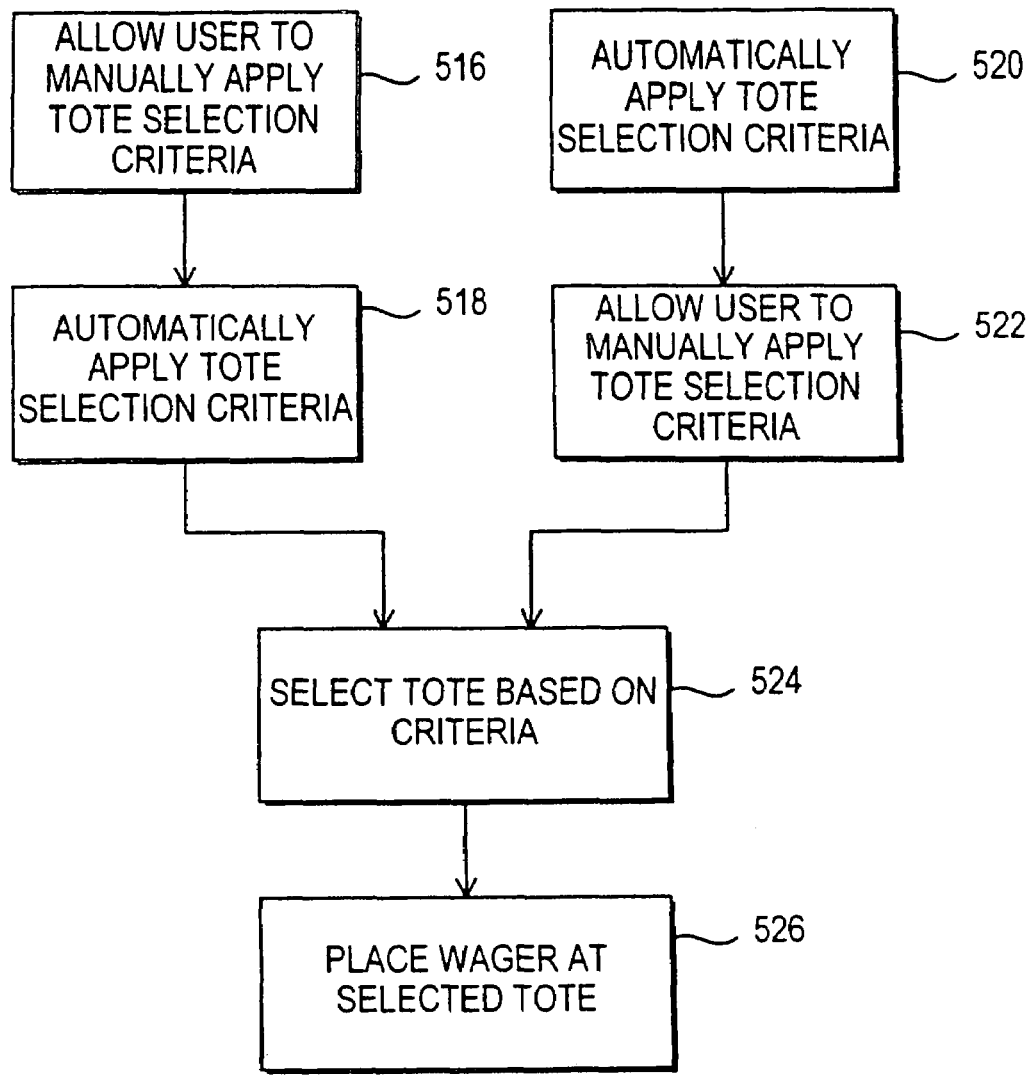
FIG. 19 is a flow chart of illustrative steps involved in manually and automatically selecting a desired tote to use for handling the user's wagers in accordance with the present invention.

An illustrative arrangement involving both the manual and automatic application of tote selection criteria is shown in FIG. 19. At step 516, the interactive wagering application may allow the user to manually apply tote selection criteria. For example, the interactive wagering application may provide the user with an opportunity to view the odds available from various totes for the user's wagers and to highlight a given tote accordingly using a highlight region. At step 518, the interactive wagering application may automatically apply tote selection criteria. For example, if more than one tote meets the user's criteria for offering high odds, the interactive wagering application may favor one tote over the other based on which offers a better financial arrangement (e.g., lower fees, etc.) for the provider of the interactive wagering application.

If desired, the automatic selection criteria may be applied by the interactive wagering application before the user is allowed to manually apply tote selection criteria. For example, the interactive wagering application may eliminate certain totes based on low odds before displaying tote information to the user. The automatic and manual application of tote selection criteria may be performed in any suitable order or may be performed concurrently if desired.

At step 524, the interactive wagering application may select a desired tote based the tote selection criteria that were manually and automatically applied at steps such as steps 516, 518, 520, and 522.

At step 526, the wager or wagers created by the user are submitted for processing. For example, if a particular tote has been selected, the wager may be processed by that tote in real time or may be processed by transaction processing and subscription management system 24 in real time and the accounts of the tote and the transaction processing and subscription management system 24 reconciled at a later time (e.g., once per day, etc.).

The interactive wagering application may allow the user to access account information for various totes. An illustrative screen 528 that the interactive wagering application may display for the user to provide the user with account information for multiple totes is shown in FIG. 20. Screen 528 may include a list 530 of the various totes at which the user has an account. Screen 528 may also include account balance information 532 for each tote.

Figure 21:
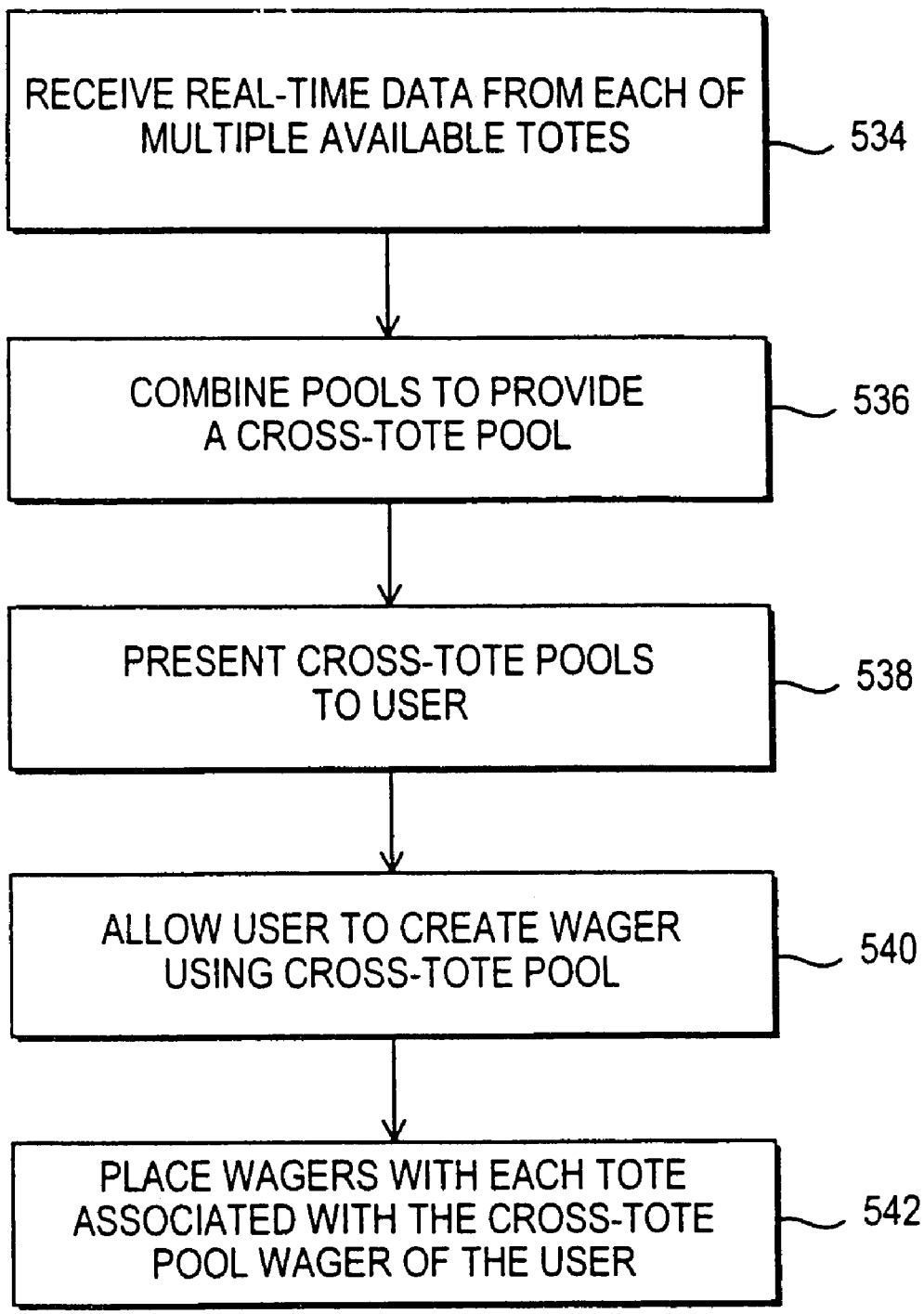
FIG. 21 is a flow chart of illustrative steps involved in supporting cross-tote wagering pools in accordance with the present invention.

Illustrative steps involved in handling cross-tote pools and the like are shown in FIG. 21. At step 534, the interactive wagering application may receive data in real-time from each of multiple available totes. For example, each tote may provide pool information on a particular win wager. The pools may be combined at step 536 using the principles of parimutuel wagering and the like. Information on the resulting cross-tote pools may be presented to the user at the user's equipment at step 538. At step 540 the user may create a wager using the cross-tote pool. At step 542, the interactive wagering application may place individual wagers at each participating tote based on the user's wager and the contribution of each tote to the pool.

Although the screens shown when illustrating the options that may be presented to the user have sometimes been described as having been generated by a set-top box or the like, these screens may be generated by any suitable user equipment including a cable system set-top box, a satellite receiver, user computer equipment such as a notebook or handheld computer, a cellular telephone with a display, or any other suitable device.

The foregoing is merely illustrative of the principles of this invention and various modifications can be made by those skilled in the art without departing from the scope and spirit of the invention.

What is claimed is:

1. A system in which an interactive wagering application is used to selectively place a wager with one of a plurality of wagering pools according to predetermined criteria, comprising:
   a network that interconnects the plurality of wagering pools, wherein each wagering pool of the plurality of wagering pools accepts wagers for the same race event and accepts wagers of the same wager type; and
   user equipment that is connected to the network and operative to:
      enable a user to define the predetermined criteria by which the interactive wagering application selects wagering pools for placing wagers; and
      enable the user to create a wager, wherein the created wager comprises a wager type selected by the user;
   wherein the interactive wagering application automatically applies the predetermined criteria to determine which one of the plurality of wagering pools the wager is to be placed.

2. The system defined in claim 1, wherein each wagering pool of the plurality of wagering pools is associated with a particular wagering service provider, and wherein the user equipment is further operative to display a screen for the user with the interactive wagering application that allows the user to view a list of available wagering service providers for wagering and odds information associated with each of those service providers.

3. The system defined in claim 1, wherein each wagering pool of the plurality of wagering pools is associated with a particular wagering service provider, and wherein each of the wagering service providers is a tote company.

4. The system defined in claim 1, wherein the predetermined criteria comprises best odds.

5. The system defined in claim 1, wherein each wagering pool of the plurality of wagering pools is associated with a particular wagering service provider, and wherein the predetermined criteria comprises tax status of each of the wagering service providers.

6. The system defined in claim 1, further comprising a transaction processing and subscription management system that is connected to the network and that handles the wagers sent by the user.

7. The system defined in claim 1, wherein the user equipment includes a cellular telephone, a handheld computer, a personal computer, user television equipment, a set-top box, or a combination thereof.

8. The system defined in claim 1, wherein the race is a horse race.

9. The system defined in claim 1, wherein the created wager further comprises a particular race and a particular horse selected by the user.

10. A method for using an interactive wagering application to selectively place a wager with one of a plurality of wagering pools according to predetermined criteria, comprising:
    interconnecting the plurality of wagering pools, wherein each wagering pool of the plurality of wagering pools accepts wagers for the same race event and accepts wagers of the same wager type;
    enabling a user to use user equipment to define the predetermined criteria by which the interactive wagering application selects wagering pools for placing wagers;
    enabling the user to use user equipment to create a wager, wherein the created wager comprises a wager type selected by the user; and
    using the interactive wagering application to automatically apply the predetermined criteria to determine which one of the plurality of wagering pools the wager is to be placed.

11. The method system defined in claim 10, wherein each wagering pool of the plurality of wagering pools is associated with a particular wagering service provider, the method further comprising displaying a screen for the user with the interactive wagering application that allows the user to view a list of available wagering service providers for wagering and odds information associated with each of those service providers.

12. The method defined in claim 10, wherein each wagering pool of the plurality of wagering pools is associated with a particular wagering service provider, and wherein each of the wagering service providers is a tote company.

13. The method defined in claim 10, wherein the predetermined criteria comprises best odds.

14. The method defined in claim 10, wherein each wagering pool of the plurality of wagering pools is associated with a particular wagering service provider, and wherein the predetermined criteria comprises tax status of each of the wagering service providers.

15. The method defined in claim 10, further comprising handling the wagers sent by the user with a transaction processing and subscription management system.

16. The method defined in claim 10, wherein the race is a horse race.

17. The method defined in claim 10, wherein the created wager further comprises a particular race and a particular horse selected by the user.

* * * * *